US 9,372,800 B2

(12) United States Patent
Akkawi et al.

(10) Patent No.: US 9,372,800 B2
(45) Date of Patent: Jun. 21, 2016

(54) INTER-CHIP INTERCONNECT PROTOCOL FOR A MULTI-CHIP SYSTEM

(71) Applicant: Cavium, Inc., San Jose, CA (US)

(72) Inventors: Isam Akkawi, Santa Clara, CA (US); Richard E. Kessler, Northborough, MA (US); David H. Asher, Sutton, MA (US); Bryan W. Chin, San Diego, CA (US); Wilson P. Snyder, II, Holliston, MA (US)

(73) Assignee: Cavium, Inc., San Jose, CA (US)

( * ) Notice: Subject to any disclaimer, the term of this patent is extended or adjusted under 35 U.S.C. 154(b) by 64 days.

(21) Appl. No.: 14/201,513

(22) Filed: Mar. 7, 2014

(65) Prior Publication Data

US 2015/0254183 A1    Sep. 10, 2015

(51) Int. Cl.
*G06F 12/08* (2006.01)
*G06F 12/14* (2006.01)
(Continued)

(52) U.S. Cl.
CPC ........ *G06F 12/0833* (2013.01); *G06F 12/0813* (2013.01); *G06F 12/0831* (2013.01); *G06F 3/0683* (2013.01); *G06F 12/084* (2013.01); *G06F 12/0822* (2013.01); *G06F 12/0828* (2013.01); *G06F 13/1663* (2013.01);
(Continued)

(58) Field of Classification Search
CPC .......... G06F 12/0828; G06F 2212/621; G06F 12/084; G06F 12/0822; G06F 3/0683; G06F 13/1663
USPC ................................................. 711/141, 148
See application file for complete search history.

(56) References Cited

U.S. PATENT DOCUMENTS 5,414,833 A    5/1995   Hershey et al.
5,848,068 A    12/1998  Daniel et al.
(Continued)

FOREIGN PATENT DOCUMENTS

CN    101036117      9/2007
EP    2 568 380 A2   3/2013
(Continued)

OTHER PUBLICATIONS

Notification of Transmittal of the International Search Report and the Written Opinion of the International Searching Authority for PCT/US2014/072811, "Method and System for Work Scheduling in a Multi-Chip System", date of mailing Mar. 27, 2015.
(Continued)

*Primary Examiner* — Ly D Pham
(74) *Attorney, Agent, or Firm* — Hamilton, Brook, Smith & Reynolds, P.C.

(57) ABSTRACT

A multi-chip system includes multiple chip devices configured to communicate to each other and share resources. According to at least one example embodiment, a method of providing memory coherence within the multi-chip system comprises maintaining, at a first chip device of the multi-chip system, state information indicative of one or more states of one or more copies, residing in one or more chip devices of the multi-chip system, of a data block. The data block is stored in a memory associated with one of the multiple chip devices. The first chip device receives a message associated with a copy of the one or more copies of the data block from a second chip device of the multiple chip devices, and, in response, executes a scheme of one or more actions determined based on the state information maintained at the first chip device and the message received.

24 Claims, 17 Drawing Sheets

(51) Int. Cl.
*G06F 12/00* (2006.01)
*G06F 13/00* (2006.01)
*G06F 13/16* (2006.01)
*G06F 3/06* (2006.01)

(52) U.S. Cl.
CPC ....... *G06F2212/154* (2013.01); *G06F 2212/62* (2013.01); *G06F 2212/621* (2013.01)

(56) References Cited

U.S. PATENT DOCUMENTS

| | | | |
|---|---|---|---|
| 5,915,088 | A | 6/1999 | Basavaiah et al. |
| 5,982,749 | A | 11/1999 | Daniel et al. |
| 6,131,113 | A | 10/2000 | Ellsworth et al. |
| 6,269,428 | B1 | 7/2001 | Carpenter et al. |
| 6,631,448 | B2 | 10/2003 | Weber |
| 6,633,958 | B1 | 10/2003 | Passint et al. |
| 6,754,223 | B1 | 6/2004 | Lussier et al. |
| 6,992,755 | B2 | 1/2006 | Safranek et al. |
| 7,085,266 | B2 | 8/2006 | Calvignac et al. |
| 7,149,212 | B2 | 12/2006 | Calvignac et al. |
| 7,827,362 | B2 | 11/2010 | Passerini |
| 7,941,585 | B2 | 5/2011 | Asher et al. |
| 8,473,658 | B2 | 6/2013 | Sanzone et al. |
| 8,504,780 | B2 | 8/2013 | Mine et al. |
| 8,595,401 | B2 | 11/2013 | Sanzone et al. |
| 2001/0013089 | A1 | 8/2001 | Weber |
| 2002/0176429 | A1 | 11/2002 | Calvignac et al. |
| 2003/0131201 | A1 | 7/2003 | Khare et al. |
| 2003/0233523 | A1* | 12/2003 | Jamil ................. G06F 12/0817 711/144 |
| 2004/0006658 | A1 | 1/2004 | Chae et al. |
| 2005/0013294 | A1* | 1/2005 | Cypher ........................ 370/389 |
| 2005/0027947 | A1* | 2/2005 | Landin .......................... 711/148 |
| 2005/0044174 | A1* | 2/2005 | Landin et al. ................ 709/217 |
| 2006/0047903 | A1 | 3/2006 | Passerini |
| 2006/0059286 | A1 | 3/2006 | Bertone et al. |
| 2006/0265553 | A1 | 11/2006 | Arimilli et al. |
| 2007/0028242 | A1 | 2/2007 | Martin et al. |
| 2008/0109609 | A1* | 5/2008 | Shen ................... G06F 12/0831 711/146 |
| 2009/0077326 | A1 | 3/2009 | Motohashi |
| 2009/0271141 | A1 | 10/2009 | Coskun et al. |
| 2010/0191920 | A1* | 7/2010 | Fang .................. G06F 12/0835 711/146 |
| 2010/0303157 | A1 | 12/2010 | Abe et al. |
| 2011/0153942 | A1 | 6/2011 | Jaine et al. |
| 2011/0158250 | A1 | 6/2011 | Basso et al. |
| 2012/0155474 | A1 | 6/2012 | Kessler et al. |
| 2012/0260017 | A1 | 10/2012 | Mine et al. |
| 2013/0097608 | A1 | 4/2013 | Kessler et al. |
| 2013/0100812 | A1 | 4/2013 | Snyder, II et al. |
| 2013/0111000 | A1 | 5/2013 | Kravitz et al. |
| 2013/0111090 | A1 | 5/2013 | Miller et al. |
| 2013/0111141 | A1 | 5/2013 | Kessler et al. |
| 2013/0125097 | A1* | 5/2013 | Ebcioglu et al. ............... 717/136 |
| 2013/0174174 | A1 | 7/2013 | Jung et al. |
| 2014/0079071 | A1 | 3/2014 | Kessler et al. |
| 2014/0089591 | A1* | 3/2014 | Moir ......................... G06F 9/50 711/130 |
| 2014/0173210 | A1 | 6/2014 | O'Connor et al. |
| 2014/0181394 | A1 | 6/2014 | Hum et al. |
| 2014/0294014 | A1 | 10/2014 | Cheng et al. |
| 2015/0039866 | A1 | 2/2015 | Jennings et al. |
| 2015/0143044 | A1* | 5/2015 | Gulati ................. G06F 12/0811 711/121 |
| 2015/0149722 | A1* | 5/2015 | Kannan ............... G06F 12/0842 711/122 |
| 2015/0253997 | A1 | 9/2015 | Kessler et al. |
| 2015/0254104 | A1 | 9/2015 | Kessler et al. |
| 2015/0254182 | A1 | 9/2015 | Asher et al. |
| 2015/0254207 | A1 | 9/2015 | Kessler |

FOREIGN PATENT DOCUMENTS

| | | |
|---|---|---|
| TW | 201346769 | 11/2013 |
| WO | WO 99/12103 A2 | 3/1999 |
| WO | WO 2013/100984 A1 | 7/2013 |
| WO | WO 2015/134098 A1 | 9/2015 |
| WO | WO 2015/134099 A1 | 9/2015 |
| WO | WO 2015/134100 A1 | 9/2015 |
| WO | WO 2015/134101 A1 | 9/2015 |
| WO | WO 2015/134103 A1 | 9/2015 |

OTHER PUBLICATIONS

Notification of Transmittal of the International Search Report and the Written Opinion of the International Searching Authority for PCT/US2014/072806, "Multi-Core Network Processor Interconnect With Multi-Node Connection", Date of Mailing: Apr. 13, 2015.

Notification of Transmittal of the International Search Report and the Written Opinion of the International Searching Authority for PCT/US2014/072816, "Method and System for Ordering I/O Access in a Multi-Node Environment", Date of Mailing: Mar. 18, 2015.

Notification of Transmittal of the International Search Report and the Written Opinion of the International Searching Authority for PCT/US2014/072799, "Inter-Chip Interconnect Protocol for a Multi-Chip System", Date of Mailing: Apr. 8, 2015.

Notification of Transmittal of the International Search Report and the Written Opinion of the International Searching Authority for PCT/US2014/072808, "Method and Apparatus for Memory Allocation in a Multi-Node System", Date of Mailing: Mar. 12, 2015.

Martin, M.M.K., et al. "Why On-Chip Cache Coherence is Here to Stay," Communications of the ACM, 9 pages, Jul. 2012.

Saglam, B.E. and Mooney, III, V.J. "System-On-A-Chip Processor Synchronization Support in Hardware," Design, Automation and Test in Europe, Conference and Proceedings Mar. 13-16, 2001 Piscataway, NJ, pp. 633-639.

* cited by examiner

INTER-CHIP INTERCONNECT PROTOCOL FOR A MULTI-CHIP SYSTEM

BACKGROUND

Significant advances have been achieved in microprocessor technology. Such advances have been driven by a consistently increasing demand for processing power and speed in communications networks, computer devices, handheld devices, and other electronic devices. The achieved advances have resulted in substantial increase in processing speed, or power, and on-chip memory capacity of processor devices existing in the market. Other results of the achieved advances include reduction in the size and power consumption of microprocessor chips.

Increase in processing power has been achieved by increasing the number of transistors in a microprocessor chip, adopting multi-core structure, as well as other improvements in processor architecture. The increase in processing power has been an important factor contributing to improved performance of communication networks, as well as to the huge burst in smart handheld devices and related applications.

SUMMARY

According to at least one example embodiment, a chip device architecture includes an inter-chip interconnect interface configured to enable efficient and reliable cross-chip communications in a multi-chip system. The inter-chip interconnect interface, together with processes and protocols employed by the chip devices in the multi-chip, or multi-node, system, allow resources' sharing between the chip devices within the multi-node system.

According to at least one example embodiment, a method of providing memory coherence within the multi-chip system comprises maintaining, at a first chip device of the multi-chip system, state information indicative of one or more states of one or more copies of a data block. The data block is stored in a memory associated with one of the multiple chip devices. The one or more copies reside in one or more chip devices of the multiple chip devices. The first chip device receives a message associated with a copy of the one or more copies of the data block from a second chip device of the multiple chip devices. In response to the message received, the first chip device executes a scheme of one or more actions determined based on the state information maintained at the first chip device and the message received.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
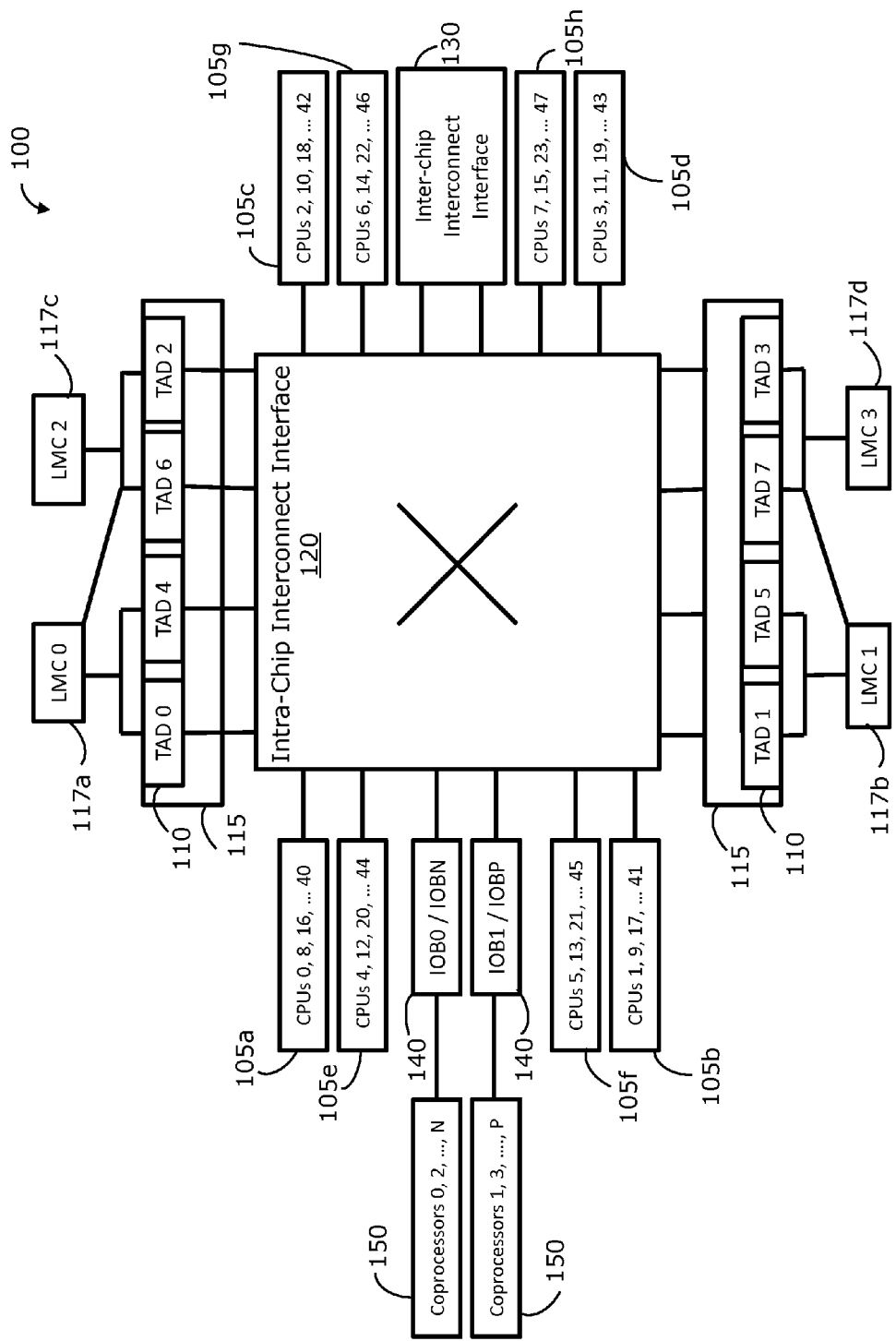
FIG. 1 is a diagram illustrating architecture of a chip device according to at least one example embodiment.

A description of example embodiments of the invention follows.

Many existing networking processor devices, such as OCTEON devices by Cavium Inc., include multiple central processing unit (CPU) cores, e.g., up to 32 cores. The underlying architecture enables each core processor in a corresponding multi-core chip to access all dynamic random-access memory (DRAM) directly attached to the multi-core chip. Also, each core processor is enabled to initiate transactions on any input/output (I/O) device in the multi-core chip. As such, each multi-core chip may be viewed as a standalone system whose scale is limited only by the capabilities of the single multi-core chip.

Multi-core chips usually provide higher performance with relatively lower power consumption compared to multiple single-core chips. In parallelizable applications, the use of a multi-core chip instead of a single-core chip leads to significant gain in performance. In particular, speedup factors may range from one to the number of cores in the multi-core chip depending on how parallelizable the applications are. In communications networks, many of the typical processing tasks performed at a network node are executable in parallel, which makes the use of multi-core chips in network devices suitable and advantageous.

The complexity and bandwidth of many communication networks have been continuously increasing with increasing demand for data connectivity, network-based applications, and access to Internet. Since increasing processor frequency has run its course, the number of cores in multi-core networking chips has been increasing in recent years to accommodate demand for more processing power within network elements such as routers, switches, servers, and/or the like. However, as the number of cores increases within a chip, managing access to corresponding on-chip memory as well as corresponding attached memory becomes more and more challenging. For example, when multiple cores attempt to access a memory component simultaneously, the speed of processing the corresponding access operations is constrained by the capacity and speed of the bus through which memory access is handled. Furthermore, implementing memory coherency within the chip gets more challenging as the number of cores increases.

According to at least one example embodiment, a new processor architecture, for a new generation of processors, allows a group of chip devices to operate as a single chip device. Each chip device includes an inter-chip interconnect interface configured to couple the chip device to other chip devices forming a multi-chip system. Memory coherence methods are employed in each chip device to enforce memory coherence between memory components associated with different chip devices in the multi-chip system. Also, methods for assigning processing tasks to different core processors in the multi-chip system, and methods for allocating cache blocks to chip devices within the multi-chip system, are employed within the chip devices enabling the multi-chip system to operate like a single chip. Furthermore, methods for synchronizing access, by cores in the multi-chip system, to input/output (I/O) devices are used to enforce efficient and conflict-free access to (I/O) devices in the multi-chip system.

Chip Architecture

FIG. 1 is a diagram illustrating the architecture of a chip device 100 according to at least one example embodiment. In the example architecture of FIG. 1, the chip device includes a plurality of core processors, e.g., 48 cores. Each of the core processors includes at least one cache memory component, e.g., level-one (L1) cache, for storing data within the core processor. According to at least one aspect, the plurality of core processors are arranged in multiple clusters, e.g., 105a-105h, referred to also individually or collectively as 105. For example, for a chip device 100 having 48 cores arranged into eight clusters 105a-105h, each of the clusters 105a-105h includes six core processor. The chip device 100 also includes a shared cache memory, e.g., level-two (L2) cache 110, and a shared cache memory controller 115 configured to manage and control access of the shared cache memory 110. According to at least one aspect, the shared cache memory 110 is part of the cache memory controller 115. A person skilled in the art should appreciate that the shared cache memory controller 115 and the shared cache memory 110 may be designed to be separate devices coupled to each other. According to at least one aspect, the shared cache memory 110 is partitioned into multiple tag and data units (TADs). The shared cache memory 110, or the TADs, and the corresponding controller 115 are coupled to one or more local memory controllers (LMCs), e.g., 117a-117d, configured to enable access to an external, or attached, memory, such as, data random access memory (DRAM), associated with the chip device 100 (not shown in FIG. 1).

According to at least one example embodiment, the chip device 100 includes an intra-chip interconnect interface 120 configured to couple the core processors and the shared cache memory 110, or the TADs, to each other through a plurality of communications buses. The intra-chip interconnect interface 120 is used as a communications interface to implement memory coherence within the chip device 100. As such, the intra-chip interconnect interface 120 may also be referred to as a memory coherence interconnect interface. According to at least one aspect, the intra-chip interconnect interface 120 has a cross-bar (xbar) structure.

According to at least one example embodiment, the chip device 100 further includes one or more coprocessors 150. A coprocessor 150 includes an I/O device, a compression/decompression processor, a hardware accelerator, a peripheral component interconnect express (PCIe), or the like. The core processors 150 are coupled to the intra-chip interconnect interface 120 through I/O bridges (IOBs) 140. As such, the coprocessors 150 are coupled to the core processors and the shared memory cache 110, or TADs, through the IOBs 140 and the intra-chip interconnect interface 110. According to at least one aspect, coprocessors 150 are configured to store data in, or load data from, the shared cache memory 110, or the TADs. The coprocessors 150 are also configured to send, or assign, processing tasks to core processors in the chip device 100, or receive data or processing tasks from other components of the chip device 100.

According to at least one example embodiment, the chip device 100 includes an inter-chip interconnect interface 130 configured to couple the chip device 100 to other chip devices. In other words, the chip device 100 is configured to exchange data and processing tasks/jobs with other chip devices through the inter-chip interconnect interface 130. According to at least one aspect, the inter-chip interconnect interface 130 is coupled to the core processors and the shared cache memory 110, or the TADs, in the chip device 100 through the intra-chip interconnect interface 120. The coprocessors 150 are coupled to the inter-chip interconnect interface 130 through the IOBs 140 and the intra-chip interconnect interface 120. The inter-chip interconnect interface 130 enables the core processors and the coprocessors 150 of the chip device 100 to communicate with other core processors or other coprocessors in other chip devices as if they were in the same chip device 100. Also, the core processors and the coprocessors 150 in the chip device 100 are enabled to access memory in, or attached to, other chip devices as if the memory was in, or attached to the chip device 100.

Intra-Chip Interconnect Interface

Figure 2:
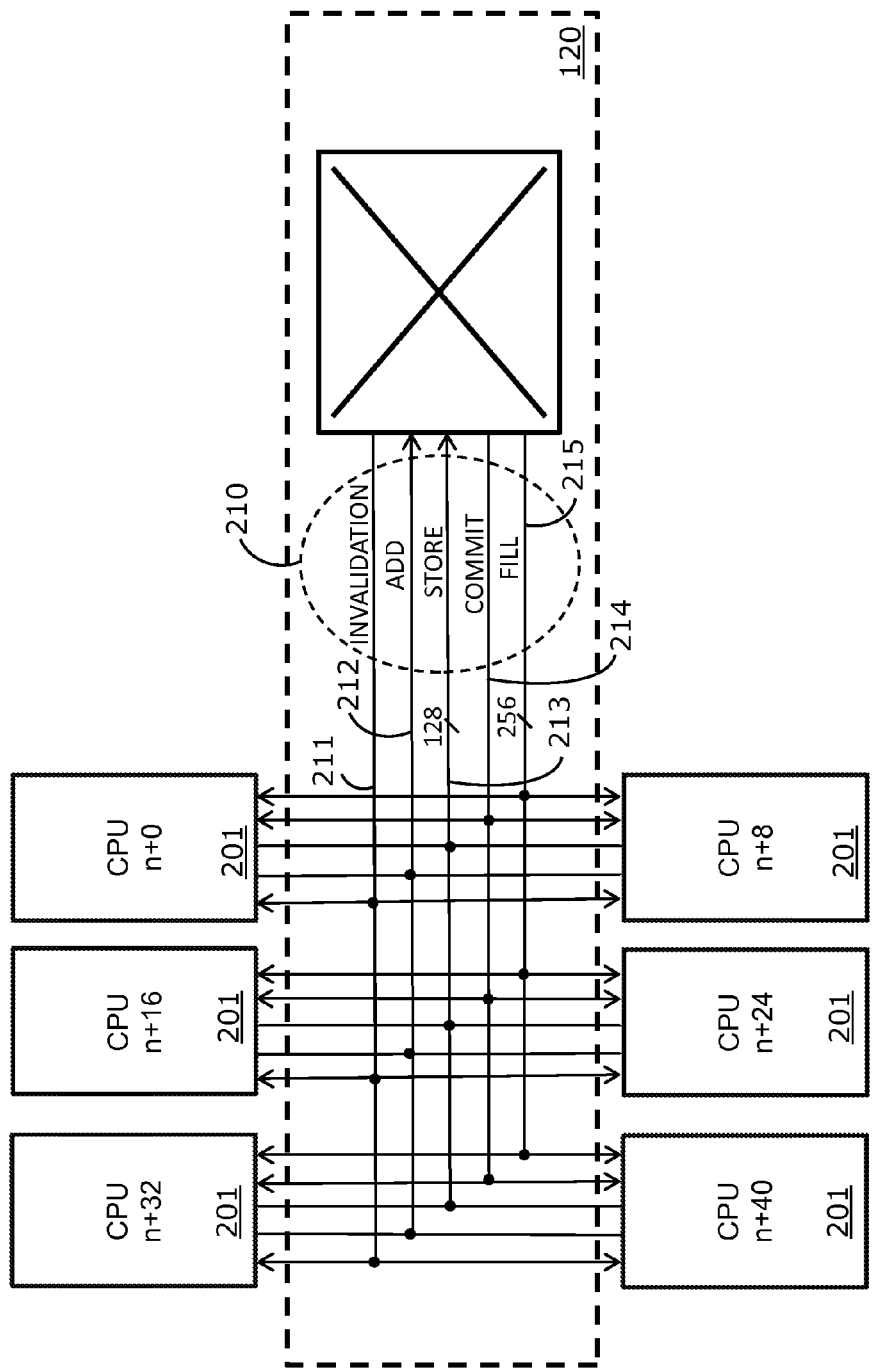
FIG. 2 is a diagram illustrating a communications bus of an intra-chip interconnect interface associated with a corresponding cluster of core processors, according to at least one example embodiment.

FIG. 2 is a diagram illustrating a communications bus 210 of the intra-chip interconnect interface 120 associated with a corresponding cluster 105 of core processors 201, according to at least one example embodiment. The communications bus 210 is configured to carry all memory and I/O transactions between the core processors 201, the I/O bridges (IOBs) 140, the inter-chip interconnect interface 130, and the shared cache memory 110, or the corresponding TADs (FIG. 1). According to at least one aspect, the communications bus 210 runs at the clock frequency of the core processors 201.

According to at least one aspect, the communications bus 210 includes five different channels; an invalidation channel 211, add channel 212, store channel 213, commit channel 214, and fill channel 215. The invalidation channel 211 is configured to carry invalidation requests, for invalidating cache blocks, from the shared cache memory controller 115 to one or more of the core processors 201 in the cluster 105. For example, the invalidation channel is configured to carry broad-cast and/or multi-cast data invalidation messages/instructions from the TADs to the core processors 201 of the cluster 105. The add channel 212 is configured to carry address and control information, from the core processors 201 to other components of the chip device 100, for initiating or executing memory and/or I/O transactions. The store channel 213 is configured to carry data associated with write operations. That is, in storing data in the shared cache memory 110 or an external memory, e.g., DRAM, a core processor 201 sends the data to the shared cache memory 110, or the corresponding controller 115, over the store channel 213. The fill channel 215 is configured to carry response data to the core processors 201 of the cluster 105 from other components of the chip device 100. The commit channel 214 is configured to carry response control information to the core processors 201 of the cluster 105. According to at least one aspect, the store channel 213 has a capacity of transferring a memory line, e.g., 128 bits, per clock cycle and the fill channel 215 has a capacity of 256 bits per clock cycle.

According to at least one example embodiment, the intra-chip interconnect interface 120 includes a separate communications bus 210, e.g., with the invalidation 211, add 212, store 213, commit 214, and fill 215 channels, for each cluster 105 of core processors 201. Considering the example architecture in FIG. 1, the intra-chip interconnect interface 120 includes eight communications buses 210 corresponding to the eight clusters 105 of core processors 201. The communications buses 210 provide communication media between the clusters 105 of core processors 201 and the shared cache memory 110, e.g., the TADs, or the corresponding controller 115.

Figure 3:
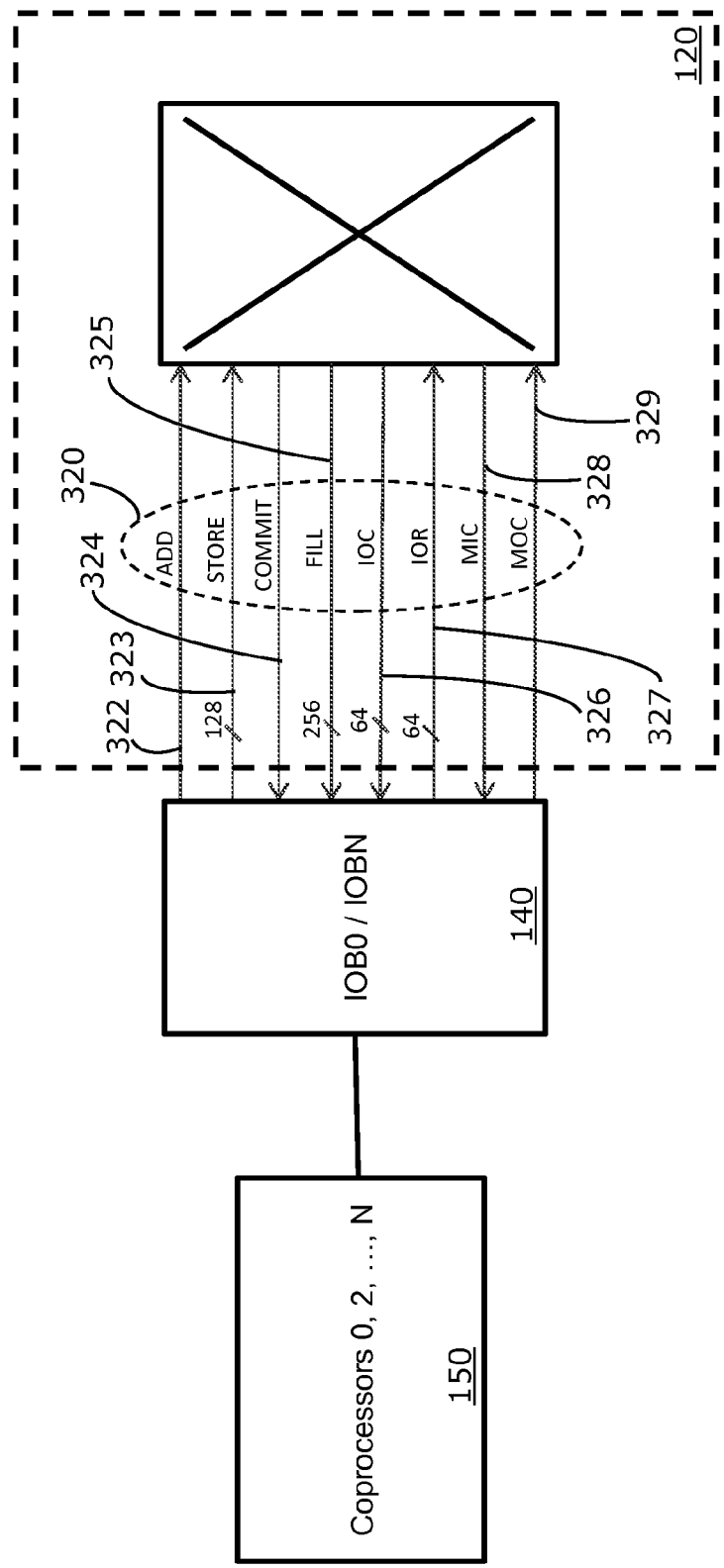
FIG. 3 is a diagram illustrating a communications bus 320 of the intra-chip interconnect interface associated with an input/output bridge (IOB) and corresponding coprocessors, according to at least one example embodiment.

FIG. 3 is a diagram illustrating a communications bus 320 of the intra-chip interconnect interface 120 associated with an input/output bridge (IOB) 140 and corresponding coprocessors 150, according to at least one example embodiment. According to at least one aspect, the intra-chip interconnect interface 120 includes a separate communication bus 320 for each IOB 140 in the chip device 100. The communications bus 320 couples the coprocessors 150 through the corresponding IOB 140 to the shared cache memory 110 and/or the corresponding controller 115. The communications bus 320 enables the coprocessors 150 coupled to the corresponding IOB 140 to access the shared cache memory 110 and exterior memory, e.g., DRAM, for example, through the controller 115.

According to at least one example embodiment, each communications bus 320 includes multiple communications channels. The multiple channels are coupled to the coprocessors 150 through the corresponding IOBs 140, and are configured to carry data between the coprocessors 150 and shared cache memory 110 and/or the corresponding controller 115. The multiple communications channels of the communications bus 320 include an add channel 322, store channel 323, commit channel 324, and a fill channel 325 similar to those in the communications bus 210. For example, the add channel 322 is configured to carry address and control information, from the coprocessors 150 to the shared cache memory controller 115, for initiating or executing operations. The store channel 323 is configured to carry data associated with write operations from the coprocessors 150 to the shared cache memory 110 and/or the corresponding controller 115. The fill channel 325 is configured to carry response data to the coprocessors 150 from the shared cache memory 110, e.g., TADs, or the corresponding controller 115. The commit channel 324 is configured to carry response control information to the coprocessors 150. According to at least one aspect, the store channel 323 has a capacity of transferring a memory line, e.g., 128 bits, per clock cycle and the fill channel 325 has a capacity of 256 bits per clock cycle.

According to at least one aspect, the communications bus 320 further includes an input/output command (IOC) channel 326 configured to transfer I/O data and store requests from core processors 201 in the chip device 100, and/or other core processors in one or more other chip devices coupled to the chip device 100 through the inter-chip interconnect interface 130, to the coprocessors 150 through corresponding IOB(s) 140. The communications bus 320 also includes an input/output response (IOR) channel 327 to transfer I/O response data, from the coprocessors 150 through corresponding IOB(s) 140, to core processors 201 in the chip device 100, and/or other core processors in one or more other chip devices coupled to the chip device 100 through the inter-chip interconnect interface 130. As such, the IOC channel 326 and the IOR channel 327 provide communication media between the coprocessors 150 in the chip device 100 and core processors in the chip device 100 as well as other core processors in other chip device(s) coupled to the chip device 100. Also, the communications bus 320 includes a multi-chip input coprocessor MIC channel 328 and a multi-chip output coprocessor (MOC) channel 329 configured to provide an inter-chip coprocessor-to-coprocessor communication media. In particular, the MIC channel 328 is configured to carry data, from coprocessors in other chip device(s) coupled to the chip device 100 through the inter-chip interconnect interface 130, to the coprocessors 150 in the chip device 100. The MOC channel 329 is configured to carry data from coprocessors 150 in the chip device 100 to coprocessors in other chip device(s) coupled to the chip device 100 through the inter-chip interconnect interface 130.

Inter-Chip Interconnect Interface

According to at least one example embodiment, the inter-chip interconnect interface 130 provides a one-to-one communication media between each pair of chip devices in a multi-chip system. According to at least one aspect, each chip device includes a corresponding inter-chip interconnect interface 130 configured to manage flow of communication data and instructions between the chip device and other chip devices.

Figure 4:
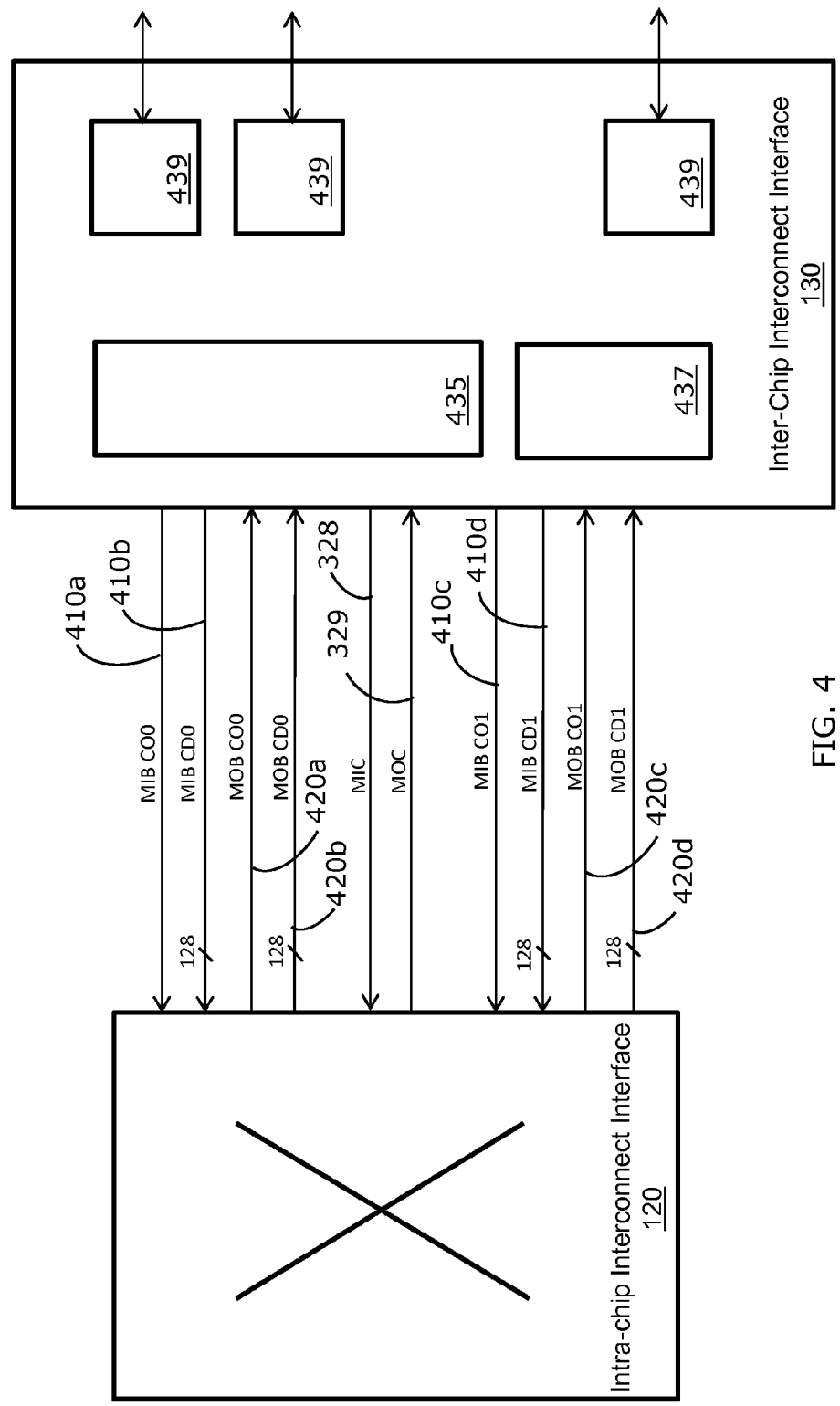
FIG. 4 is a diagram illustrating an overview of the structure of an inter-chip interconnect interface, according to at least one example embodiment.

FIG. 4 is a diagram illustrating an overview of the structure of the inter-chip interconnect interface 130. According to at least one example embodiment. According to at least one example aspect, the inter-chip interconnect interface 130 is coupled to the intra-chip interconnect interface 120 through multiple communication channels and buses. In particular, the MIC channel 328 and the MOC channel 329 run through the intra-chip interconnect interface 120 and couple the inter-chip interconnect interface 130 to the coprocessors 150 through the corresponding IOBs 140. According to at least one aspect, the MIC and MOC channels, 328 and 329, are designated to carry communications data and instructions between the coprocessors 150 on the chip device 100 and coprocessors on other chip device(s) coupled to the chip device 100. As such, the MIC and the MOC channels, 328 and 329, allow the coprocessors 150 in the chip device 100 and other coprocessors residing in one or more other chip devices to communicate directly as if they were in the same chip device. For example, a free pool allocator (FPA) coprocessor in the chip device 100 is enabled to free, or assign memory to, FPA coprocessors in other chip devices coupled to the chip device 100 through the inter-chip interconnect interface 130. Also, the MIC and MOC channels, 328 and 329, allow a packet input (PKI) coprocessor in the chip device 100 to assign processing tasks to a scheduling, synchronization, and ordering (SSO) coprocessor in another chip device coupled to the chip device 100 through the inter-chip interconnect interface 130.

According to at least one example embodiment, the inter-chip interconnect interface 130 is also coupled to the intra-chip interconnect interface 120 through a number of multi-chip input buses (MIBs), e.g., 410a-410d, and a number of multi-chip output buses (MOBs), e.g., 420a-420b. According to at least one aspect, the MIBs, e.g., 410a-410d, and MOBs, e.g., 420a-420d, are configured to carry communication data and instructions other than those carried by the MIC and MOC channels, 328 and 329. According to at least one aspect, the MIBs, e.g., 410a-410d, carry instructions and data, other than instructions and data between the coprocessors 150 and coprocessors on other chip devices, received from another chip device and destined to the core processors 201, the shared cache memory 110 or the corresponding controller 115, and/or the IOBs 140. The MOBs carry instructions and data, other than instructions and data between the coprocessors on other chip devices and the coprocessors 150, sent from the core processors 201, the shared cache memory 110 or the corresponding controller 115, and/or the IOBs 140 and destined to the other chip device(s). The MIC and MOC channels, 328 and 329, however, carry commands and data related to forwarding processing tasks or memory allocation between coprocessors in different chip devices. According to at least one aspect, the transmission capacity of each MIB, e.g., 410a-410d, or MOB, e.g., 420a-420d, is a memory data line, e.g., 128 bits, per clock cycle. A person skilled in the art should appreciate that the capacity of the MIB, e.g., 410a-410d, MOB, e.g., 420a-420d, MIC 328, MOC 329, or any other communication channel or bus may be designed differently and that any transmission capacity values provided herein are for illustration purposes and re not to be interpreted as limiting features.

According to at least one example embodiment, the inter-chip Interconnect interface 130 is configured to forward instructions and data received over the MOBs, e.g., 420a-420d, and the MOC channel 329 to appropriate other chip device(s), and to route instructions and data received from other chip devices through the MIBs, e.g., 410a-410d, and the MIC channel 328 to destination components in the chip device 100. According to at least one aspect, the inter-chip interconnect interface 130 includes a controller 435, a buffer 437, and a plurality of serializer/deserializer (SerDes) units 439. For example, with 24 SerDes units 439, the inter-chip interconnect interface 130 has a bandwidth of up to 300 Giga symbols per second (Gbaud). According to at least one aspect, the inter-chip interconnect interface bandwidth, or the SerDes units 439, is/are flexibly distributed among separate links coupling the chip device 100 to other chip devices. Each links is associated with one or more I/O ports. For example, in a case where the chip device 100 is part of a multi-chip system having four chip devices, the inter-chip interconnect interface 130 has three full-duplex links—one per each of the three other chip devices—each with bandwidth of 100 Gbaud. Alternatively, the bandwidth may not be distributed equally between the three links. In another case where the chip device 100 is part of a multi-chip system having two chip devices, the inter-chip interconnect interface 130 has one full-duplex link with bandwidth equal to 300 Gbaud.

The controller 435 is configured to exchange messages with the core processors 201 and the shared cache memory controller 115. The controller 435 is also configured to classify outgoing data messages by channels, form data blocks comprising such data messages, and transmit the data blocks via the output ports. The controller 435 is also configured to communicate with similar controller(s) in other chip devices of a multi-chip system. Transmitted data blocks may also be stored in the retry buffer 437 until receipt of the data block is acknowledged by the receiving chip device. The controller 435 is also configured to classify incoming data messages, forms blocks of such incoming messages, and route the formed blocks to proper communication buses or channels.

TAD Structure

Figure 5:
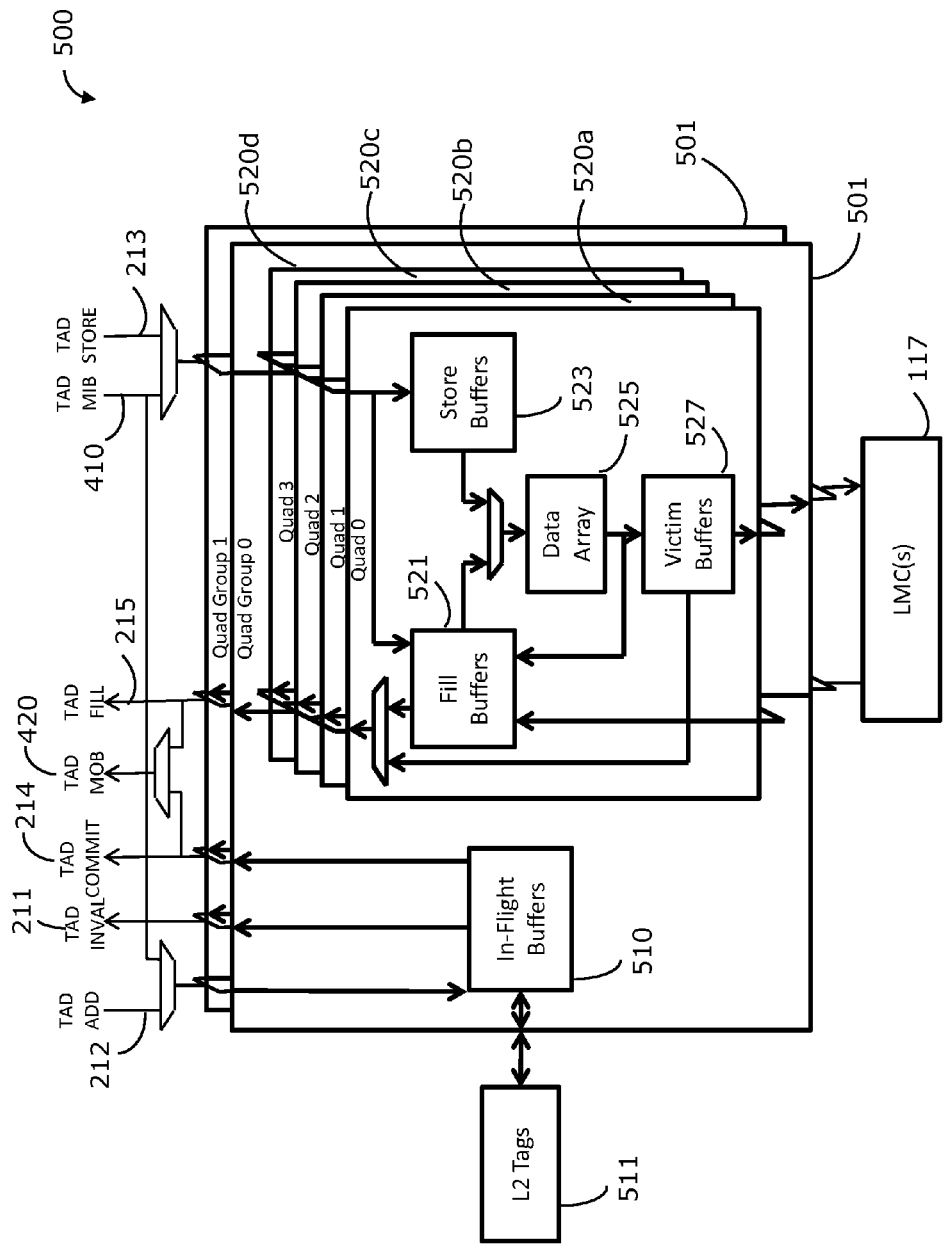
FIG. 5 is a diagram illustrating the structure of a single tag and data unit (TAD), according to at least one example embodiment.

FIG. 5 is a diagram illustrating the structure of a single tag and data unit (TAD) 500, according to at least one example embodiment. According to at least one example design, each TAD 500, includes two quad groups 501. Each quad group 501 includes a number of in-flight buffers 510 configured to store memory addresses and four quad units 520a-520d also referred to either individually or collectively as 520. Each TAD group 501 and the corresponding in-flight buffers 510 are couple to shared cache memory tags 511 associated with cache memory controller 115. According to at least one example design of the chip device 100, each quad group includes 16 in-flight buffers 510. A person skilled in the art should appreciate that the number of in-flight buffers may be chosen, e.g., by the chip device 100 manufacturer or buyer. According to at least one aspect, the in-flight buffers are configured to receive data block addresses from an add channel 212 and/or a MIB 410 coupled to the in-flight buffers 510. That is, data block addresses associated with an operation to be initiated are stored within the in-flight buffers 510. The in-flight buffers 510 are also configured to send data block addresses over an invalidation channel 211, commit channel 214, and/or MOB 420 that are coupled to the TAD 500. That is, if a data block is to be invalidated, the corresponding address is sent from the in-flight buffers 510 over the invalidation channel 211 or the MOB 420 if invalidation is to occur in another chip device, to the core processors with copies of the data block. Also, if a data block is the subject of an operation performed by the shared cache memory controller 115, the corresponding address is sent over the commit channel 214, or the MOB 420 to a core processor that requested execution of the operation.

Each quad unit 520 includes a number of fill buffers 521, number of store buffers 523, data array 525, and number of victim buffers 527. According to at least one aspect, the fill buffers 521 are configured to store response data, associated with corresponding requests, for sending to one or more core processors 201 over a fill channel 215 coupled to the TAD 500. The fill buffers 521 are also configured to receive data through a store channel 213 or MIB 410, coupled to the TAD 500. Data is received through a MIB 410 at the fill buffers 521, for example, if response data to a request resides in another chip device. The fill buffers 521 also receive data from the data array 525 or from the main memory, e.g., DRAM, attached to the chip device 100 through a corresponding LMC 117. According to at least one aspect, the victim buffers 527 are configured to store cache blocks that are replaced with other cache blocks in the data array 525.

The store buffers 523 are configured to maintain data for storing in the data array 525. The store buffers 523 are also configured to receive data from the store channel 213 or the MIB 410 coupled to the TAD 500. Data is received over MIB 410 if the data to be stored is sent from a remote chip device. The data arrays 525 in the different quad units 520 are the basic memory components of the shared cache memory 110. For example, the data arrays 525 associated with a quad group 501 have a cumulative storage capacity of 1 Mega Byte (MB). As such, each TAD has a storage capacity of 2 MB while the shared cache memory 110 has storage capacity of 16 MB.

A person skilled in the art should appreciate that in terms of the architecture of the chip device 100, the number of the core processors 201, the number of clusters 105, the number of TADs, the storage capacity of the shared cache memory 110, and the bandwidth of the inter-chip interconnect interface 130 are to be viewed as design parameters that may be set, for example, by a manufacturer or buyer of the chip device 100.

Multi-Chip Architecture

The architecture of the chip device 100 in general and the inter-chip interconnect interface 130 in particular allow multiple chip devices to be coupled to each other and to operate as a single system with computational and memory capacities much larger than that of the single chip device 100. Specifically, the inter-chip interconnect interface 130 together with a corresponding inter-chip interconnect interface protocol, defining a set of messages for use in communications between different nodes, allow transparent sharing of resources among chip devices, also referred to as nodes, within a multi-chip, or multi-node, system.

Figure 6C:
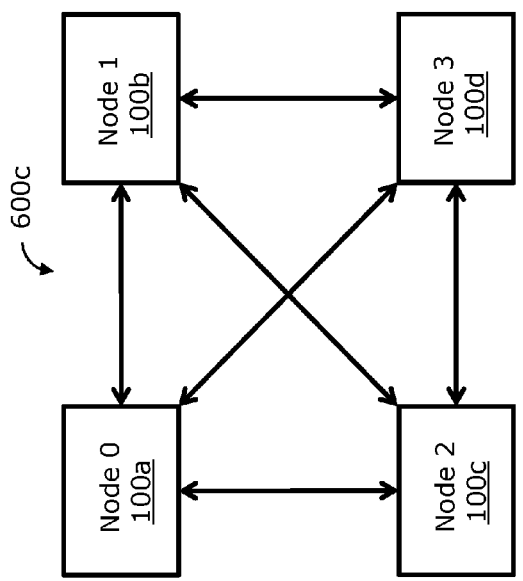
FIGS. 6A-6C are overview diagrams illustrating different multi-node systems, according to at least one example embodiment.
Figure 6A:
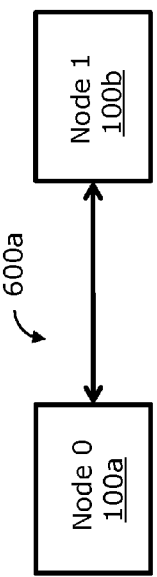
Figure 6B:
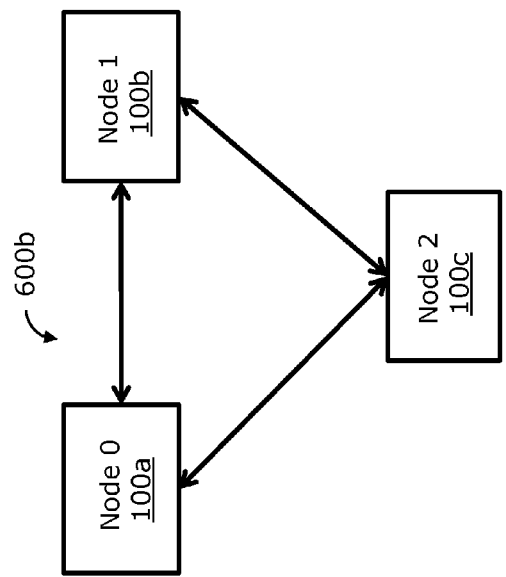

FIGS. 6A-6C are overview diagrams illustrating different multi-node systems, according to at least one example embodiment. FIG. 6A shows a multi-node system 600a having two nodes 100a and 100b coupled together through an inter-chip interconnect interface link 610. FIG. 6B shows a multi-node system 600b having three separate nodes 100a-100c with each pair of nodes being coupled through a corresponding inter-chip interconnect interface link 610. FIG. 6C shows a multi-node system 600c having four separate nodes 100a-100d. The multi-node system 600c includes six inter-chip interconnect interface links 610 with each link coupling a corresponding pair of nodes. According to at least one example embodiment, a multi-node system, referred to hereinafter as 600, is configured to provide point-to-point communications between any pair of nodes in the multi-node system through a corresponding inter-chip interconnect interface link coupling the pair of nodes. A person skilled in the art should appreciate that the number of nodes in a multi-node system 600 may be larger than four. According to at least one aspect, the number of nodes in a multi-node system may be dependent on a number of point-to-point connections supported by the inter-chip interconnect interface 130 within each node.

Besides the inter-chip interconnect interface 130 and the point-to-point connection between pairs of nodes in a multi-node system, an inter-chip interconnect interface protocol defines a set of messages configured to enable inter-node memory coherence, inter-node resource sharing, and cross-node access of hardware components associated with the nodes. According to at least one aspect, memory coherence methods, methods for queuing and synchronizing work items, and methods of accessing node components are implemented within chip devices to enhance operations within a corresponding multi-node system. In particular, methods and techniques described below are designed to enhance processing speed of operations and avoid conflict situations between hardware components in the multi-node system. As such, techniques and procedures that are typically implemented within a single chip device, as part of carrying out processing operations, are extended in hardware to multiple chip devices or nodes.

A person skilled in the art should appreciate that the chip device architecture described above provides new system scalability options via the inter-chip interconnect interface 130. To a large extent, the inter-chip interconnect interface 130 allows multiple chip devices to act as one coherent system. For example, forming a four-node system using chip devices having 48 core processors 201, up to 256 GB of DRAM, SerDes-based I/O capability of up to 400 Gbaud full duplex, and various coprocessors, the corresponding four-node system scales up to 192 core processors, one Tera Byte (TB) of DRAM, 1.6 Tera baud (Tbaud) I/O capability, and four times the coprocessors. The core processors, within the four-node system, are configured to access all DRAM, I/O devices, coprocessors, etc., therefore, the four-node system operates like a single node system with four times the capabilities of a single chip device.

Work Scheduling and Memory Allocation

The hardware capabilities of the multi-node system 600 are multiple times the hardware capabilities of each chip device in the multi-node system 600. However, in order for the increase in hardware capacities, in the multi-node system 600 compared to single chip devices, to reflect positively on the performance of the multi-node system 600, methods and techniques for handling processing operations in a way that takes into account the multi-node architecture are employed in chip devices within the multi-node system 600. In particular, methods for queuing, scheduling, synchronization, and ordering of work items that allow distribution of work load among core processors in different chip devices of the multi-node system 600 are employed.

According to at least one example embodiment, the chip device 100 includes hardware features that enable support of work queuing, scheduling, synchronization, and ordering. Such hardware features include a schedule/synchronize/order (SSO) unit, free pool allocator (FPA) unit, packet input (PKI) unit, and packet output (PKO) unit, which provide together a framework enabling efficient work items' distribution and scheduling. Generally, a work item is a software routine or handler to be performed on some data.

Figure 7:
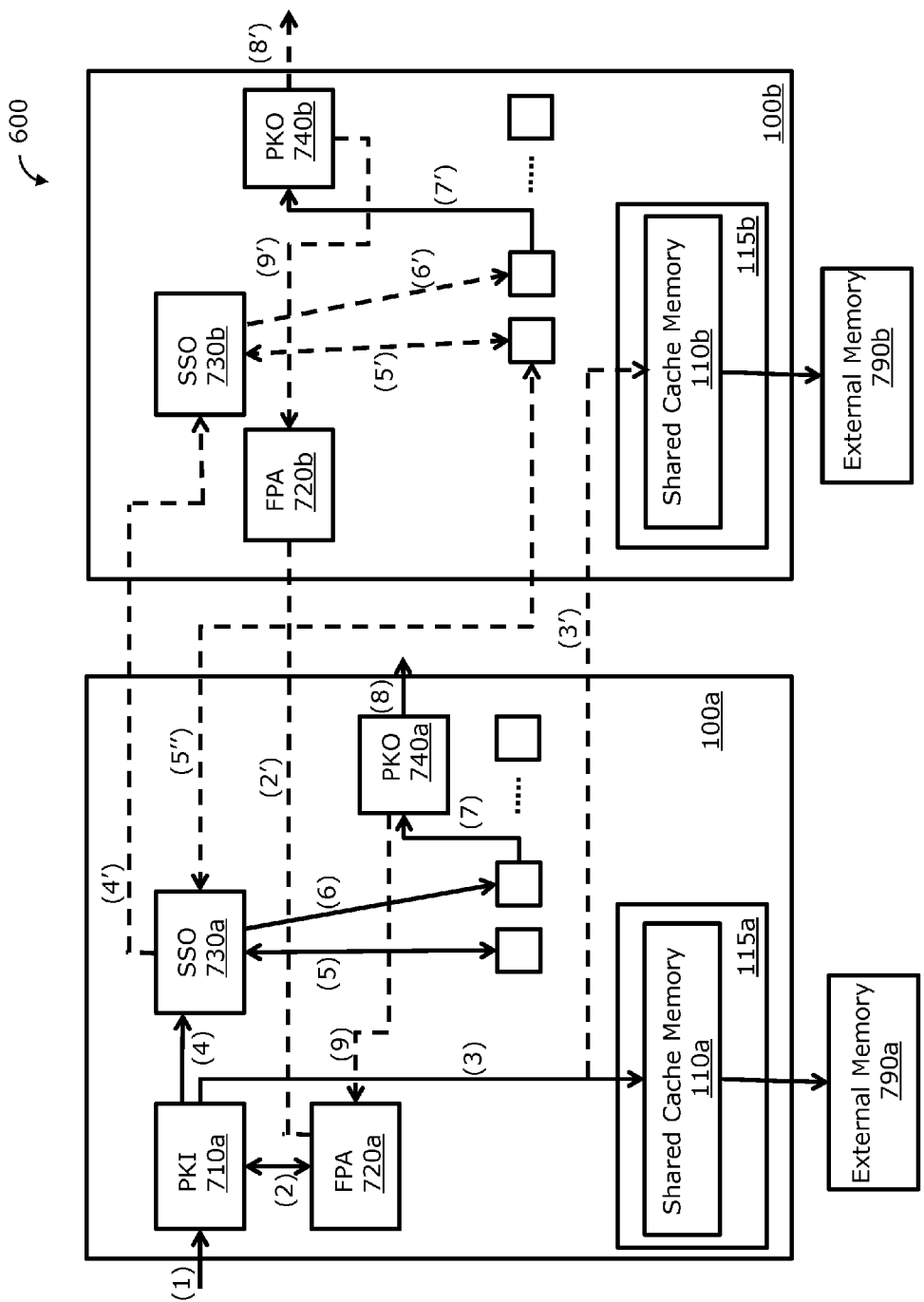
FIG. 7 is a block diagram illustrating handling of a work item within a multi-node system, according to at least one example embodiment.

FIG. 7 is a block diagram illustrating handling of a work item within a multi-node system 600, according to at least one example embodiment. For simplicity, only two nodes 100a and 100b of the multi-node system are shown, however, the multimode system 600 may include more than two nodes. In the example of FIG. 7, the node 100a includes a PKI unit 710a, FPA unit 720a, SSO unit 730a, and PKO unit 740a. These hardware units are coprocessors of the chip device 100a. In particular, the SSO unit 730a is the coprocessor which provides queuing, scheduling/de-scheduling, and synchronization of work items. The node 100a also includes multiple core processors 201a and a shared cache memory 110a. The node 100a is also coupled to an external memory 790a, e.g., DRAM, through the shared cache memory 110a or the corresponding controller 115a. The multi-node system 600 includes another node 100b including a FPA unit 720b, SSO unit 730b, PKO unit 740b, multiple core processors 201b, and shared cache memory 110b with corresponding controller 115b. The shared cache memory 110b and the corresponding controller 115b are coupled to an external memory 790b associated with node 100b. In the following, the indication of a specific node, e.g., "a" or "b," in the numeral of a hardware component is omitted when the hardware component is referred to in general and not in connection with a specific node.

A work item may be created by either hardware units, e.g., PKI unit 710, PKO unit 740, PCIe, etc., or a software running on a core processor 201. For example, upon receiving a data packet (1), the PKI unit 710a scans the data packet received and determines a processing operation, or work item, to be performed on the data packet. Specifically, the PKI unit 710a creates a work-queue entry (WQE) representing the work item to be performed. According to at least one aspect, the WQE includes a work-queue pointer (WQP), indication of a group, or queue, a tag type, and a tag. Alternatively, the WQE may be created by a software, for example, running in one of the core processors 201 in the multi-chip system 600, and a corresponding pointer, WQP, is passed to a coprocessor 150 acting as a work source.

The WQP points to a memory location where the WQE is stored.

Specifically, at (2), the PKI unit 710a requests a free-buffer pointer from the FPA unit 720a, and stores (3) the WQE in the buffer indicated by the pointer returned by the FPA unit 720a. The buffer may be a memory location in the shared cache memory 110a or the external memory 790a. According to at least one aspect, every FPA unit 720 is configured to maintain a number, e.g., K, of pools of free-buffer pointers. As such, core processors 201 and coprocessors 150 may allocate a buffer by requesting a pointer from the FPA unit 720 or free a buffer by returning a pointer to the FPA unit 720. Upon requesting and receiving a pointer from the FPA unit 720a, the PKI unit 710a stores (3) the WQE created in the buffer indicated by the received pointer. The pointer received from the FPA unit 720a is the WQP used to point to the buffer, or memory location, where the WQE is stored. The WQE is then (4) designated by the PKI unit 710a to an SSO unit, e.g., 730a, within the multi-node system 600. Specifically, the WQP is submitted to a group, or queue, among multiple groups, or queues, of the SSO unit 730a.

According to at least one example embodiment, each SSO 730 in the multi-node system 600 schedules work items using multiple groups, e.g., L groups, with work on one group flows independently from work on all other groups. Groups, or queues, provide a means to execute different functions on different core processors 201 and provide quality of service (QoS) even though multiple core processors share the same SSO unit 730a. For example, packet processing may be pipelined from a first group of core processors to a second group of core processors, with the first group performing a first stage of work and the second group performing a next stage of work. According to at least one aspect, the SSO unit 730 is configured to implement static priorities and group-affinity arbitration between these groups. The use of multiple groups in a SSO unit 730 allows the SSO 730 to schedule work item in parallel whenever possible. According to at least one aspect, each work source, e.g., PKI unit 710, core processors 201, PCIe, etc., enabled to create work items is configured to maintain a list of the groups, or queues, available in all SSO units of the multi-node system 600. As such, each work source makes use of the maintained list to designate work items to groups in the SSO units 730.

According to at least one example embodiment, each group in a SSO unit 730 is identified through a corresponding identifier. Assume that there are n SSO units 730 in the multi-node system 600, with, for example, one SSO unit 730 in each node 100, and L groups in each SSO unit 730. In order to uniquely identify all the groups, or queues, within all the SSO units 730, each group identifier includes at least $\log_2$ (n) bits to identify the SSO unit 730 associated with group and at least $\log_2$ (L) bits to identify the group within the corresponding SSO unit 730. For example, if there are four nodes each with a single SSO unit 730 having 254 groups, each group may be identified using a 10-bit identifier with two bits identifying the SSO unit 730 associated with the group and eight other bits to distinguish between groups within the same SSO unit 730.

After receiving the WQP at (4), the SSO unit 730a is configured to assign the work item to a core processor 201 for handling. In particular, core processors 201 request work from the SSO unit 730a and the SSO unit 730a responds by assigning the work item to one of the core processors 201. In particular, the SSO unit 730 is configured to respond back with a WQP pointing to the WQE associated with the work item. The SSO unit 730a may assign the work item to a processor core 201a in the same node 100a as illustrated by (5). Alternatively, the SSO unit 730a may assign the work item to a core processor, e.g., 201b, in a remote node, e.g., 100b, as illustrated in (5''). According to at least one aspect, each SSO unit 730 is configured to assign a work item to any core processor 201 in the multi-node system 600. According to yet another aspect, each SSO unit 730 is configured to assign work items only to core processors 201 on the same node 100 as the SSO unit 730.

A person skilled in the art should appreciate that a single SSO unit 730 may be used to schedule work in the multi-node system 600. In such case, all work items are sent the single SSO unit 730 and all core processors 201 in the multi-node system 600 request and get assigned work from the same single SSO unit 730. Alternatively, multiple SSO units 730 are employed in the multi-node system 600, e.g., one SSO unit 730 in each node 100 or only a subset of nodes 100 having one SSO unit 730 per node 100. In such case, the multiple SSO units 730 are configured to operate independently and no synchronization is performed between the different SSO units 730. Also, different groups, or queues, of the SSO units 730 operate independent of each other. In the case where each node 100 includes a corresponding SSO unit 730, each SSO unit may be configured to assign work items only to core processors 201 in the same node 100. Alternatively, each SSO unit 730 may assign work items to any core processor in the multi-node system 600.

According to at least one aspect, the SSO unit 730 is configured to assign work items associated with the same work flow, e.g., same communication session, same user, same destination point, or the like, to core processors in the same node. The SSO unit 730 may be further configured to assign work items associated with the same work flow to a subset of core processors 201 in the same node 100. That is, even within a given node 100, the SSO unit 730 may designate work items associated with a given work flow, and/or a given processing stage, to a first subset of core processors 201, while work items associated with a different work flow, or a different processing stage of the same work flow, to a second subset of core processors 201 in the same node 100. According to yet another aspect, the first subset of core processors and the second subset of core processors are associated with different nodes 100 of the multi-node system 600.

Assuming multi-stage processing operations are associated with the data packet, once a core processor 201 is selected to handle a first-stage work item, as shown in (5) or (5''), the selected processor processes the first-stage work item and then creates a new work item, e.g., a second-stage work item, and the corresponding pointer is sent to a second group, or queue, different than the first group, or queue, to which the first-stage work item was submitted. The second group, or queue, may be associated with the same SSO unit 730 as indicated by (5). Alternatively, the core processor 201 handling the first-stage work item may schedule the second-stage work item on a different SSO unit 730 than the one used to schedule the first-stage work item. The use of multiple groups, or queues, that handle corresponding working items independent of each other enables work ordering with no synchronization performed between distinct groups or SSO units 730.

At (6), the second-stage work item is assigned to a second core processor 201a in node 100a. The second core processor 201a processes the work item and then submits it to the PKO unit 740a, as indicated by (7), for example, if all work items associated with the data packet are performed. The PKO unit, e.g., 740*a* or 740*b*, is configured to read the data packet from memory and send it off the chip device (see (8) and (8')). Specifically, the PKO unit, e.g., 740*a* or 740*b*, receives a pointer to the data packet from a core processor 201, and use the pointer to retrieve the data packet from memory. The PKO unit, e.g., 740*a* or 740*b*, may also free the buffer where the data packet was stored in memory by returning the pointer to the FPA unit, e.g., 720*a* or 720*b*.

A person skilled in the art should appreciate that memory allocation and work scheduling may be viewed as two separate processes. Memory allocation may be performed by, for example, a PKI unit 710, core processor 201, or another hardware component of the multi-node system 600. A component performing memory allocation is referred to as a memory allocator. According to at least one aspect, each memory allocator maintains a list of the pools of free-buffer pointers available in all FPA units 720 of the multi-node system 600. Assume there are m FPA units 720 in the multi-node system 600, each having K pools of free-buffer pointers. In order to uniquely identify all the pools within all the FPA units 720, each pool identifier includes at least $\log_2$ (m) bits to identify the FPA unit 720 associated with the pool and at least $\log_2$ (K) bits to identify pools within a given corresponding FPA unit 720. For example, if there are four nodes each with a single FPA unit 720 having 64 pools, each pool may be identified using an eight-bit identifier with two bits identifying the FPA unit 720 associated with the pool and six other bits to distinguish between pools within the same FPA unit 720.

According to at least one example embodiment, the memory allocator sends a request for a free-buffer pointer to a FPA unit 720 and receives a free-buffer pointer in response, as indicated by (2). According to at least one aspect, the request includes an indication of a pool from which the free-buffer pointer is to be selected. The memory allocator is aware of associations between pools of free-buffer pointers and corresponding FPA units 720. By receiving a free-buffer pointer from the FPA unit 720, the corresponding buffer, or memory location, pointed to by the pointer is not free anymore, but is rather allocated. That is, memory allocation may be considered completed upon receipt of the pointer by the memory allocator. The same buffer, or memory location, is freed later, by the memory allocator or another component such as the PKO unit 740, when the pointer is returned back to the FPA unit 720.

When scheduling a work item, a work source, e.g., a PKI unit 710, core processor 201, PCIe, etc., may be configured to schedule work items only through a local SSO unit 730, e.g., a SSO unit residing in the same node 100 as the work source. In such case, if the group, or queue, selected by the work source does not belong to the local SSO unit 720, the pointer is forwarded to a remote SSO unit, e.g., not residing in the same node 100 as the work source, associated with the selected group and the work item is then assigned by the remote SSO unit 720, as indicated by (4'). Once the forwarding of the WQE pointer is done in (4'), the operations indicated by (5)-(9) may be replaced with similar operations in the remote node indicated by (5')-(9').

A person skilled in the art should appreciate that memory allocation within the multi-node system may be implemented according to different embodiments. First, the free-buffer pools associated with each FPA unit 720 may be configured in way that each FPA unit 720 maintains a list of pools corresponding to buffers, or memory locations, associated with same node 100 as the FPA unit 720. That is, the pointers in pools associated with a given FPA unit 720 point to buffers, or memory locations, in the shared cache memory 110 residing in the same node 100 as the FPA unit 720, or in the external memory 790 attached to same node 100 where the FPA unit 720 resides. Alternatively, the list of pools maintained by a given FPA unit 720 includes pointers pointing to buffers, or memory locations, associated with remote nodes 100, e.g., nodes 100 different from the node 100 where the FPA unit 720 resides. That is, any FPA free list may hold a pointer to any buffer from any node 100 of the multi-node system 600.

Second, a single FPA unit 720 may be employed within the multi-node system 600, in which case, all requests for free-buffer pointers are directed to the single FPA unit when allocating memory, and all pointers are returned to the single FPA unit 720 when freeing memory. Alternatively, multiple FPA units 720 are employed within the multi-node system 600. In such a case, the multiple FPA units 720 operate independently of each other with little, or no, inter-FPA-units communication employed. According to at least one aspect, each node 100 of the multi-node system 600 includes a corresponding FPA unit 720. In such case, each memory allocator is configured to allocate memory through the local FPA unit 720, e.g., the FPA unit 720 residing on the same node 100 as the memory allocator. If the pool indicated in a free-buffer pointer request from the memory allocator to the local FPA unit 720 belongs to a remote FPA unit 720, e.g., not residing in the same node 100 as the memory allocator, the free-buffer pointer request is forwarded from the local FPA unit 720 to the remote FPA unit 720, as indicated by (2'), and a response is sent back to the memory allocator through the local FPA unit 720.

The forwarding of the free-buffer pointer request is made over the MIC and MOC channels, 328 and 329, given that the forwarding is based on communications between two coprocessors associated with two different nodes 100. The use of MIC and MOC channels, 328 and 329, to forward free-buffer pointer requests between FPA units 720 residing on different nodes 100 ensures that the forwarding transactions do not add cross-channel dependencies to existing channels. Alternatively, memory allocators may be configured to allocate memory through any FPA unit 720 in the multi-node system 600.

Third, when allocating memory for data associated a work item, the memory allocator may be configured to allocate memory in the same node 100 where the work item is assigned. That is the memory is allocated in the same node where the core processor 201 handling the work item resides, or in the same node 100 as the SSO unit 730 to which the work item is scheduled. A person skilled in the art should appreciate that the work scheduling may be performed prior to memory allocation, in which case memory allocated in the same node 100 to which the work item is assigned. However, if memory allocation is performed prior to work scheduling, then the work item is assigned to the same node 100 where memory is allocated for corresponding data. Alternatively, memory to store data corresponding to a work item may be allocated to different node 100 than the one to which the work item was assigned.

A person skilled in the art should appreciate that work scheduling and memory allocation with a multi-node system, e.g., 600, may be performed according to different combinations of the embodiments described herein. Also, a person skilled in the art should appreciate that all cross-node communications, shown in FIG. 7 or referred to with regard to work scheduling embodiments and/or memory allocation embodiments described herein, are handled through inter-chip interconnect interfaces 130, associated with the nodes 100 involved in the cross-node communications, and interchip interconnect interface link 610 coupling such nodes 100.

Memory Coherence in Multi-Node Systems

A multi-node system, e.g., 600, includes more core processors 201 and memory components, e.g., shared cache memories 110 and external memories 790, than the corresponding nodes, or chip devices, 100 in the same multi-node system, e.g., 600. As such, implementing memory coherence procedures within a multi-node system, e.g., 600, is more challenging than implementing such procedures within a single chip device 100. Also, implementing memory coherence globally with the multi-node system, e.g., 600, would involve cross-node communications, which raise potential delay issues as well as issues associated with addressing the hardware resources in the multi-node system, e.g., 600. Considering such challenges, an efficient and reliable memory coherence approach for multi-node systems, e.g., 600, is a significant step towards configuring the multi-node system, e.g., 600, to operate as a single node, or chip device, 100 with significantly larger resources.

Figure 8:
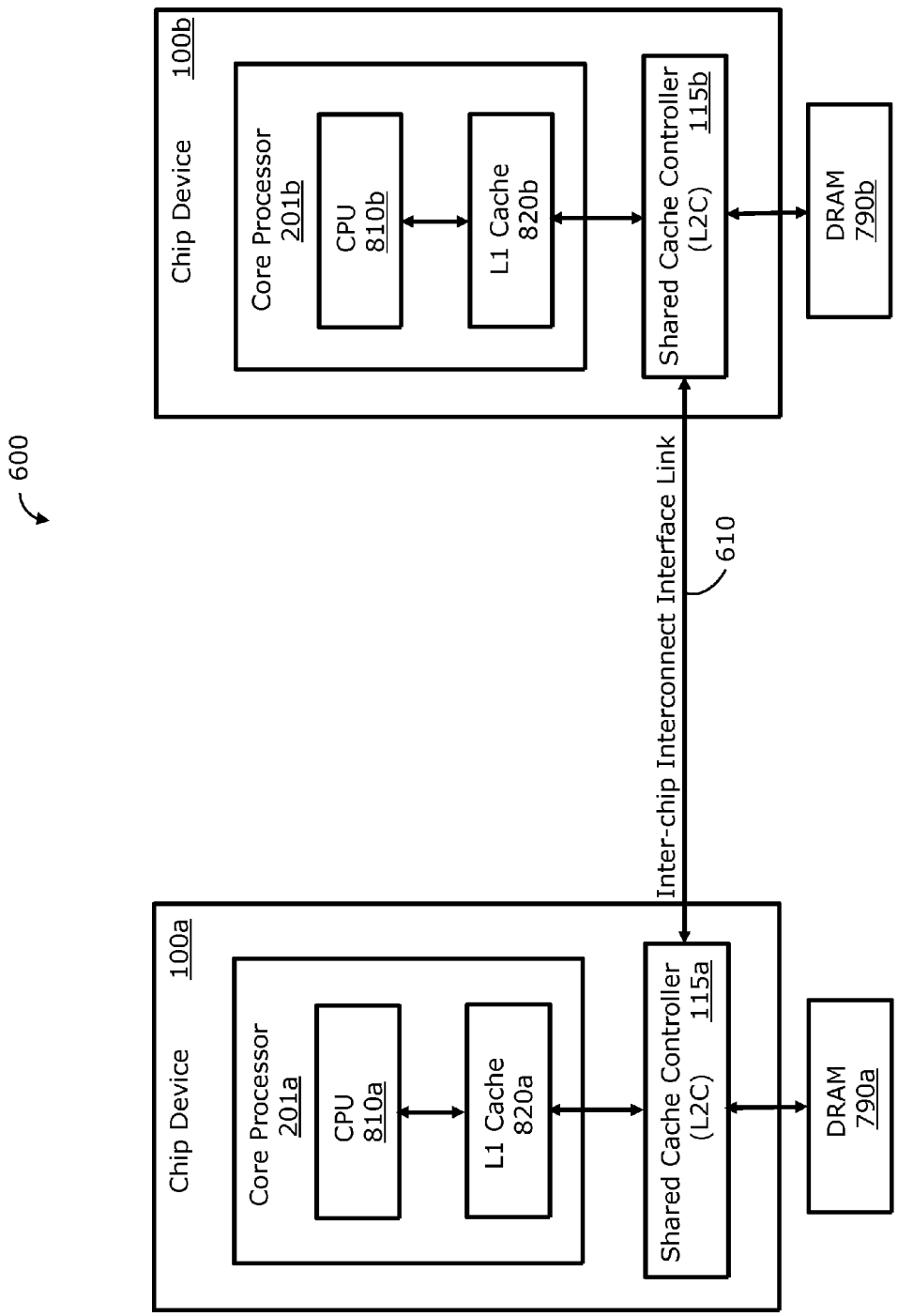
FIG. 8 is a block diagram depicting cache and memory levels in a multi-node system, according to at least one example embodiment.

FIG. 8 is a block diagram depicting cache and memory levels in a multi-node system 600, according to at least one example embodiment. For simplicity, FIG. 8 shows only two chip devices, or nodes, 100a and 100b, of the multi-node system 600. Such simplification should not be interpreted as a limiting feature. That is, neither the multi-node system 600 is to be limited to a two-node system, nor memory coherence embodiments described herein are to be restrictively associated with two-node systems only. According to at least one aspect, each node, 100a, 100b, or generally 100, is coupled to a corresponding external memory, e.g., DRAM, referred to as 790a, 790b, or 790 in general. Also, each node 100 includes one or more core processors, e.g., 201a, 201b, or 201 in general, and a shared cache memory controller, e.g., 115a, 115b, or 115 in general. Each cache memory controller 115 includes, and/or is configured to manage, a corresponding shared cache memory, 110a, 110b, or 110 in general (not shown in FIG. 8). According to at least one example embodiment, each pair of nodes, e.g., 100a and 100b, of the multi-node system 600 are coupled to each other through an interchip interconnect interface link 610.

For simplicity, a single core processor 201 is shown in each of the nodes 100a and 100b in FIG. 8. A person skilled in the art should appreciate that each of the nodes 100 in the multi-node 600 may include one or more core processors 201. The number of core processors 201 may be different from one node 100 to another 100 node in the same multi-node system 600. According to at least one aspect, each core processor 201 includes a central processing unit, 810a, 810b, or 810 in general, and local cache memory, 820a, 820b, or 820 in general, such as a level-one (L1) cache. A person skilled in the art should appreciate that the core processors 201 may include more than one level of cache as local cache memory. Also, many hardware components associated with nodes 100 of the multi-node system 600, e.g., components shown in FIGS. 1-5 and 7, are omitted in FIG. 8 for the sake of simplicity.

According to at least one aspect, a data block associated with a memory location within an external memory 790 coupled to a corresponding node 100, may have multiple copies residing, simultaneously, within the multi-node system 600. The corresponding node 100 coupled to the external memory 790 storing the data block is defined as the home node for the data block. For the sake of simplicity, a data block stored in the external memory 790a is considered herein. As such, the node 100a is the home node for the data block, and any other nodes, e.g., 100b, of the multi-node system 600 are remote nodes. Copies of the data block, also referred to herein as cache blocks associated with the data block, may reside in the shared cache memory 110a, or local cache memories 820a within core processors 201a, of the home node 100a. Such cache blocks are referred to as home cache blocks. Cache block(s) associated with the data block may also reside in shared cache memory, e.g., 110b, or local cache memories, e.g., 820b, within core processors, e.g., 201b, of a remote node, e.g., 100b. Such cache blocks are referred to as remote cache blocks. Memory coherence, or data coherence, aims at enforcing such copies to be up-to-date. That is, if one copy is modified at a given point of time, the other copies are invalid According to at least one example embodiment, a memory request associated with the data block, or any corresponding cache block, is initiated, for example, by a core processor 201 or an IOB 140 of the multi-node system 160. According to at least one aspect, the IOB 140 initiates memory requests on behalf of corresponding I/O devices, or agents, 150. Herein, a memory request is a message or command associated with a data block, or any corresponding cache blocks. Such request includes, for example, a read/load operation to request a copy of the data block by a requesting node from another node. The memory request also includes a store/write operation to store the cache block, or parts of the cache block, in memory. Other examples of the memory request are listed in the Tables 1-3.

According to a first scenario, the core processor, e.g., 201a, or the IOB, e.g., 140a, initiating the memory request resides in the home node 100a. In such case, the memory request is sent from the requesting agent, e.g., core processor 201a or IOB 140, directly to the shared cache memory controller 115a of the home node 100a. If the memory request is determined to be triggering invalidations of other cache blocks, associated with the data block, the shared cache memory controller 115a of the home node 100a determines if any other cache blocks, associated with the data block, are cached within the home node 100a. An example of a memory request triggering invalidation is a store/write operation where a modified copy of the data block is to be stored in memory. Another example of a memory request triggering invalidation is a request of an exclusive copy of the data block by a requesting node. The node receiving such request causes copies of the data block residing in other chip devices, other than the requesting node, to be invalidated, and provides the requesting node with an exclusive copy of the data block (See FIG. 16 and the corresponding description below where the RLDX command represents a request for an exclusive copy of the data block).

According to at least one aspect, the shared cache memory controller 115a of the home node 100a first checks if any other cache blocks, associated with the data block, are cached within local cache blocks 820a associated with core processors 201a or IOBs 140, other than the requesting agent, of the home node 100a. If any such cache blocks are determined to exist in core processors 201a or IOBs 140, other than the requesting agent, of the home node 100a, the shared cache memory controller 115a of the home node sends invalidations requests to invalidate such cache blocks. The shared cache memory controller 115a of the home node 100a may update a local cache block, associated with the data block, stored in the shared cache memory 110 of the home node.

According to at least one example embodiment, the shared cache memory controller 115a of the home node 100a also checks if any other cache blocks, associated with the data block, are cached in remote nodes, e.g., 100b, other than the home node 100a. If any remote node is determined to include a cache block, associated with the data block, the shared cache memory controller 115a of the home node 100a sends invalidation request(s) to remote node(s) determined to include such cache blocks. Specifically, the shared cache memory controller 115a of the home node 100a is configured to send an invalidation request to the shared cache memory controller, e.g., 115b, of a remote node, e.g., 100b, determined to include a cache block associated with the data block through the inter-chip—interconnect interface link 610. The shared cache memory controller, e.g., 115b, of the remote node, e.g., 100b, then determines locally which local agents include cache blocks, associated with the data block, and sends invalidation requests to such agents. The shared cache memory controller, e.g., 115b, of the remote node, e.g., 100b, may also invalidate any cache block, associated with the data block, stored by its corresponding shared cache memory.

According to a first scenario, the requesting agent resides in a remote node, e.g., 100b, other than the home node 100a. In such case, the request is first sent to the local shared cache memory controller, e.g., 115b, residing in the same node, e.g., 100b, as the requesting agent. The local shared cache memory controller, e.g., 115b, is configured to forward the memory request to the shared cache memory controller 115a of the home node 100a. According to at least one aspect, the local shared cache memory controller, e.g., 115b, also checks for any cache blocks associated with data block that may be cached within other agents, other than the requesting agent, of the same local node, e.g., 100b, and sends invalidation requests to invalidate such potential cache blocks. The local shared cache memory controller, e.g., 115b, may also check for, and invalidate, any cache block, associated with the data block, stored by its corresponding shared cache memory.

Upon receiving the memory request, the shared cache memory controller 115a of the home node 100a checks locally within the home node 100a for any cache blocks, associated with the data block, and sends invalidation requests to agents of the home node 100 carrying such cache blocks, if any. The shared cache memory controller 115a of the home node 100a may also invalidate any cache block, associated with the data block, stored in its corresponding shared cache memory in the home node 100a. According to at least one example embodiment, the shared cache memory controller 115a of the home node 100a is configured to check if any other remote nodes, other than the node sending the memory request, includes a cache block, associated with the data block. If another remote node is determined to include a cache block, associated with the data block, the shared cache memory controller 115a of the home node 100a sends an invalidation request to the shared cache memory controller 115 of the other remote node 100. The shared cache memory controller 115 of the other remote node 100 proceeds with invalidating any local cache blocks, associated with the data, by sending invalidation requests to corresponding local agents or by invalidating a cache block stored in the corresponding local shared cache memory.

According to at least one example embodiment, the shared cache memory controller 115a of the home node 100a includes a remote tag (RTG) buffer, or data field. The RTG data field includes information indicative of nodes 100 of the multi-node system 600 carrying a cache block associated with the data block. According to at least one aspect, cross-node cache block invalidation is managed by the shared cache memory controller 115a of the home node 100a, which upon checking the RTG data field, sends invalidation requests, through the inter-chip interconnect interface request 610, to shared cache memory controller(s) 115 of remote node(s) 100 determined to include a cache block associated with the data block. The shared cache memory controller(s) 115 of the remote node(s) 100 determined to include a cache block, associated with the data block, then handle locally invalidation of any such cache block(s).

According to at least one example embodiment, invalidation of cache block(s) within each node 100 of the multi-node system 600 is handled locally by the local shared cache memory controller 115 of the same node. According to at least one aspect, each shared cache memory controller 115, of a corresponding node 100, includes a local data field, also referred to herein as BUSINFO, indicative of agents, e.g., core processors 201 or IOBs 140, in the same corresponding node carrying a cache block associated with the data block. According to at least one aspect, the local data field operates according two different modes. As such, a first subset of bits of the local data field is designated to indicate the mode of operation of the local data field. A second subset of bits of the local data field is indicative of one or more cache blocks, if any, associated with the data block being cached within the same node 100.

According to a first mode of the local data field, each bit in the second subset of bits corresponds to a cluster 105 of core processors in the same node 100, and is indicative of whether any core processor 201 in the cluster carries a cache block associated with the data block. When operating according to the first mode, invalidation requests are sent, by the local shared cache memory controller 115, to all core processors 201 within a cluster 105 determined to include cache block(s), associated with the data block. Each core processor 201 in the cluster 105 receives the invalidation request and checks whether its corresponding local cache memory 820 includes a cache block associated with the data block. If yes, such cache block is invalidated.

According to a second mode of the local data field, the second subset of bits is indicative of a core processor 201, within the same node, carrying a cache block associated with the data block. In such case, an invalidation request may be sent only to the core processor 201, or agent, identified by the second subset of bits, and the latter invalidates the cache block, associated with the data block, stored in its local cache memory 820.

For example, considering 48 core processors in each chip device, the BUSINFO field may have 48-bit size with one bit for each core processor. Such approach is memory consuming. Instead, a 9-bit BUSINFO field is employed. By using 9 bits, one bit is used per cluster 150 plus one extra bit is used to indicate the mode as discussed above. When the $9^{th}$ bit is set, the other 8 bits select one CPU core whose cache memory holds a copy of the data block. When the $9^{th}$ bit is clear, each of the other 8 bits represents one of the 8 clusters 105a-105h, and are set when any core processor in the cluster may hold a copy of the data block.

According to at least one aspect, memory requests triggering invalidation of cache blocks, associated with a data block, include a message, or command, indicating that a cache block, associated with the data block, was modified, for example, by the requesting agent, message, or command, indicating a request for an exclusive copy of the data block, or the like.

A person skilled in the art should appreciate that when implementing embodiments of data coherence, described herein, the order to process checking for, and/or invalidating, local cache block versus remote cache block at the home node may be set differently according to different implementations.

Managing Access of I/O Devices in a Multi-Node System

In a multi-node system, e.g., 600, designing and implementing reliable processes for sharing of hardware resources is more challenging than designing such processes in a single chip device for many reasons. In particular, enabling reliable access to I/O devices of the multi-node system, e.g., 600, by any agent, e.g., core processors 201 and/or coprocessor 150, of the multi-node system, e.g., 600, poses a lot of challenges. First, access of an I/O device by different agents residing in different nodes 100 of the multi-node system 600 may result in simultaneous attempts to access the I/O device by different agents resulting in conflicts which may stall access to the I/O device. Second, potential synchronization of access requests by agents residing in different nodes 100 of the multi-node system 600 may result in significant delays. In the following, embodiments of a process for efficient access to I/O devices in a multi-node system, e.g., 600, are described.

Figure 9:
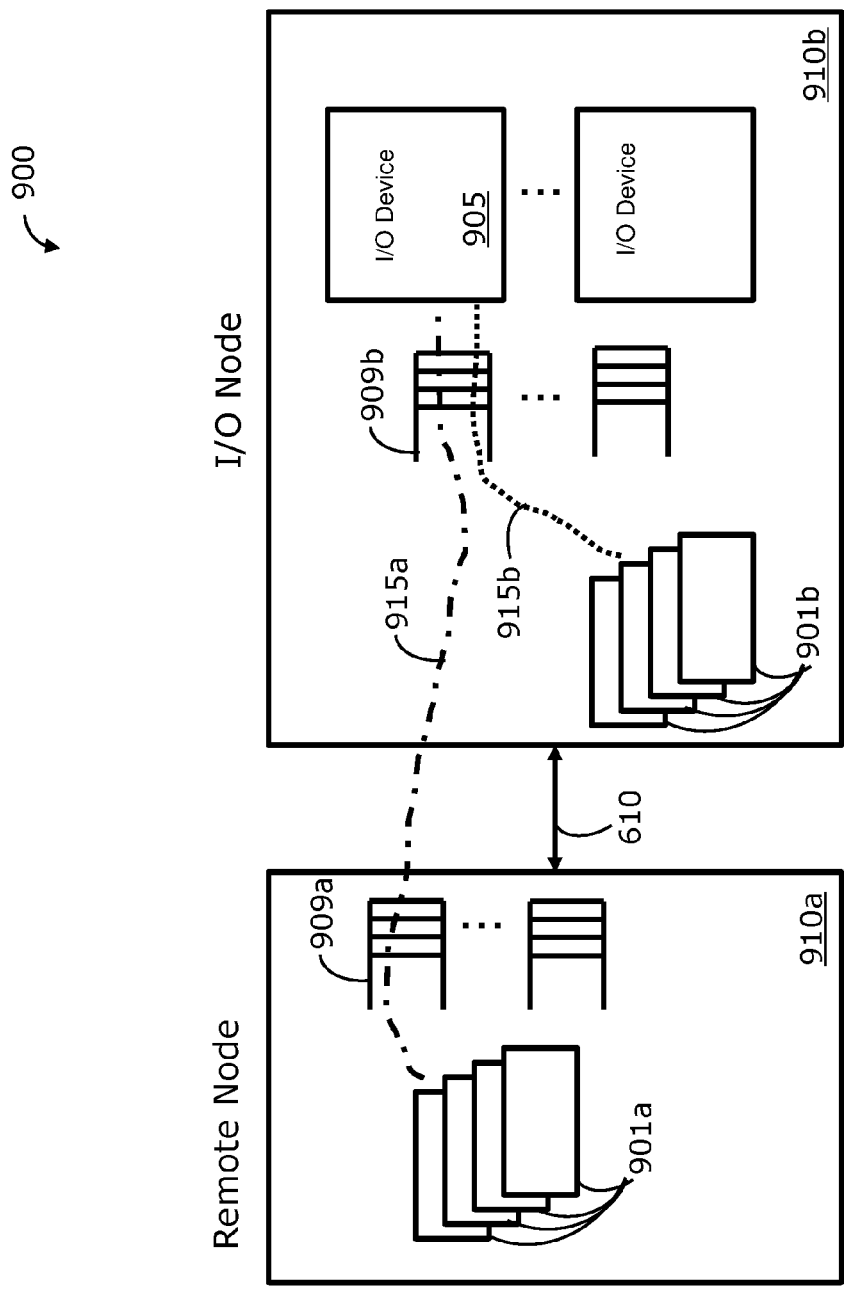
FIG. 9 is a block diagram illustrating a simplified overview of a multi-node system, according to at least one example embodiment.

FIG. 9 is a block diagram illustrating a simplified overview of a multi-node system 900, according to at least one example embodiment. For the sake of simplicity, FIG. 9 shows only two nodes, e.g., 910a and 910b, or 910 in general, of the multi-node system 900, and only one node, e.g., 910b, is shown to include I/O devices 905. Such simplification is not to be interpreted as a limiting feature to embodiments described herein. In fact, the multi-node system 900 may include any number of nodes 910, and any node 910 of the multi-node system may include zero or more I/O device 905. Each node 910 of the multi-node system 900 includes one or more core processors, e.g., 901a, 901b, or 901 in general. According to at least one example embodiment, each core processor 901 of the multi-node system 900 may access any of the I/O devices 905 in any node 910 of the multi-node system 900. According to at least one aspect, cross-node access of an I/O device residing in a first node 910 by a core processor 901 residing on a second node 910 is performed through an inter-chip interconnect interface link 610 coupling the first and second nodes 910 and the inter-chip interconnect interface (not shown in FIG. 9) of each of the first and second nodes 910.

According to at least one example embodiment, each node 910 of the multi-node system 900 includes one or more queues, 909a, 909b, or 909 in general, configured to order access requests to I/O devices 905 in the multi-node system 900. In the following, the node, e.g., 910b, including an I/O device, e.g., 905, which is the subject of one or more access requests, is referred to as the I/O node, e.g., 910b. Any other node, e.g., 910 of the multi-node system 900 is referred to as a remote node, e.g., 910a.

FIG. 9 shows two access requests 915a and 915b, also referred to as 915 in general, directed to the same I/O device 905. In such case where two or more simultaneous access requests 915 are directed to the same I/O device 905, a conflict may occur resulting, for example, installing the I/O device 905. Also, if both accesses 905 are allowed to be processed concurrently by the same I/O device, each access may end up using a different version of the same data segment. For example, a data segment accessed by one of the core processors 901 may be concurrently modified by the other core processor 901 accessing the same I/O device 905.

As shown in FIG. 9, a core processor 901a of the remote node 910a initiates the access request 915a, also referred to as remote access request 915a. The remote access request 915a is configured to traverse a queue 909a in the remote node 910a and a queue 909b in the I/O node 910b. Both queues 909a and 909b traversed by the remote access request 915a are configured to order access requests destined to a corresponding I/O device 905. That is, according to at least one aspect, each I/O device 905 has a corresponding queue 909 in each node 910 with agents attempting to access the same I/O device 905. Also, a core processor 901b of the I/O node initiates the access request 915b, also referred to as home access request 915b. The home access request 915b is configured to traverse only the queue 909b before reaching the I/O device 905. The queue 909b is designated to order local access requests, from agents in the I/O node 910b, as well as remote access requests, from remote node(s), to the I/O device 905. The queue 909a is configured to order only access requests initiated by agents in the same remote node 910a.

According to at least one example embodiment, one or more queues 909 designated to manage access to a given I/O device 905 are known to agents within the multi-node system 900. When an agent initiates a first access request destined toward the given I/O device 905, other agents in the multi-node system 900 are prevented from initiating new access requests toward the same I/O device 905 until the first access request is queued in the one or more queues 909 designated to manage access requests to the given I/O device 905.

Figure 10:
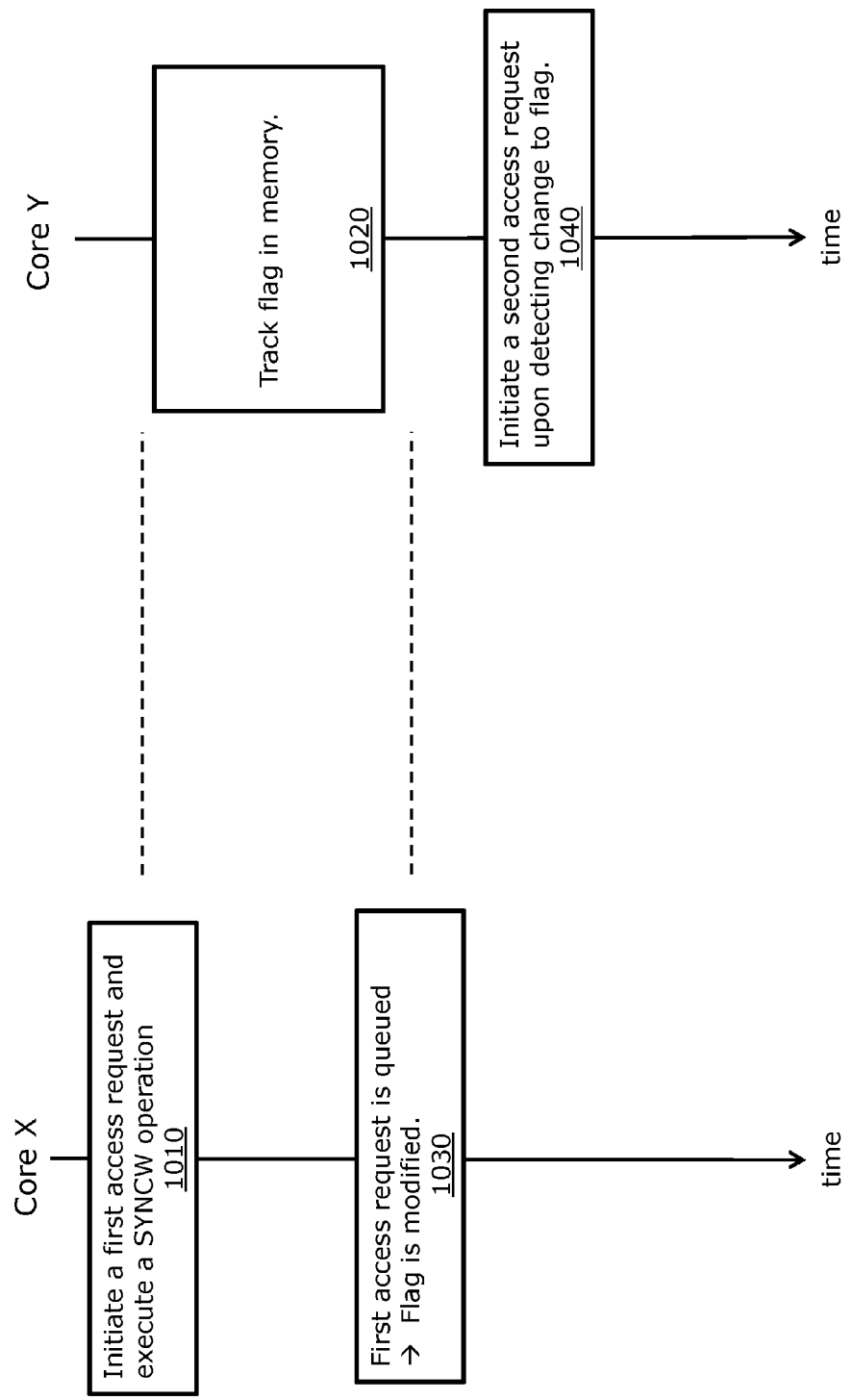
FIG. 10 is a block diagram illustrating a timeline associated with initiating access requests destined to a given I/O device, according to at least one example embodiment.

FIG. 10 is a block diagram illustrating a timeline associated with initiating access requests destined to a given I/O device, according to at least one example embodiment. According to at least one aspect, two core processors Core X and Core Y of a multi-node system 900 attempt to access the same I/O device 905. Core X initiates, at 1010, a first access request destined toward the given I/O device and starts a synchronize-write (SYNCW) operation. The SYNCW operation is configured to force a store operation, preceding one other store operation in a code, to be executed before the other store operation. The preceding store operation is configured to set a flag in a memory component of the multi-node system 900. According to at least one aspect, the flag is indicative, when set on, of an access request initiated but not queued yet. The flag is accessible by any agent in the multi-node system 900 attempting to access the same given I/O device.

Core Y is configured to check the flag at 1020. Since the flag is set on, Core Y keeps monitoring the flag at 1020. Once the first access request is queued in the one or more queues designated to manage access requests destined to the given I/O device, the flag is switched off at 1130. At 1140, Core Y detects modification to the flag. Consequently, Core Y initiates a second access request destined toward the same given I/O device 905. The core Y may start another SYNCW operation, which forces the second success request to be processed prior to any other following access request. The second success request may set the flag on again. The flag will be set on until the second access request is queued in the one or more queues designated to manage access requests destined to the given I/O device. While the flag is set on, no other agent initiates another access request destined toward the same given I/O device.

According to 1130 of FIG. 10, the flag is modified in response to a corresponding access request being queued. As such, an acknowledgement of queuing the corresponding access request is used, by the agent or software configured to set the flag on and/or off, when modifying the flag value. A remote access request traverse two queue before reaching the corresponding destination I/O device. In such case, one might ask which of the two queues sends the acknowledgement of queuing the access request.

Figure 11A:
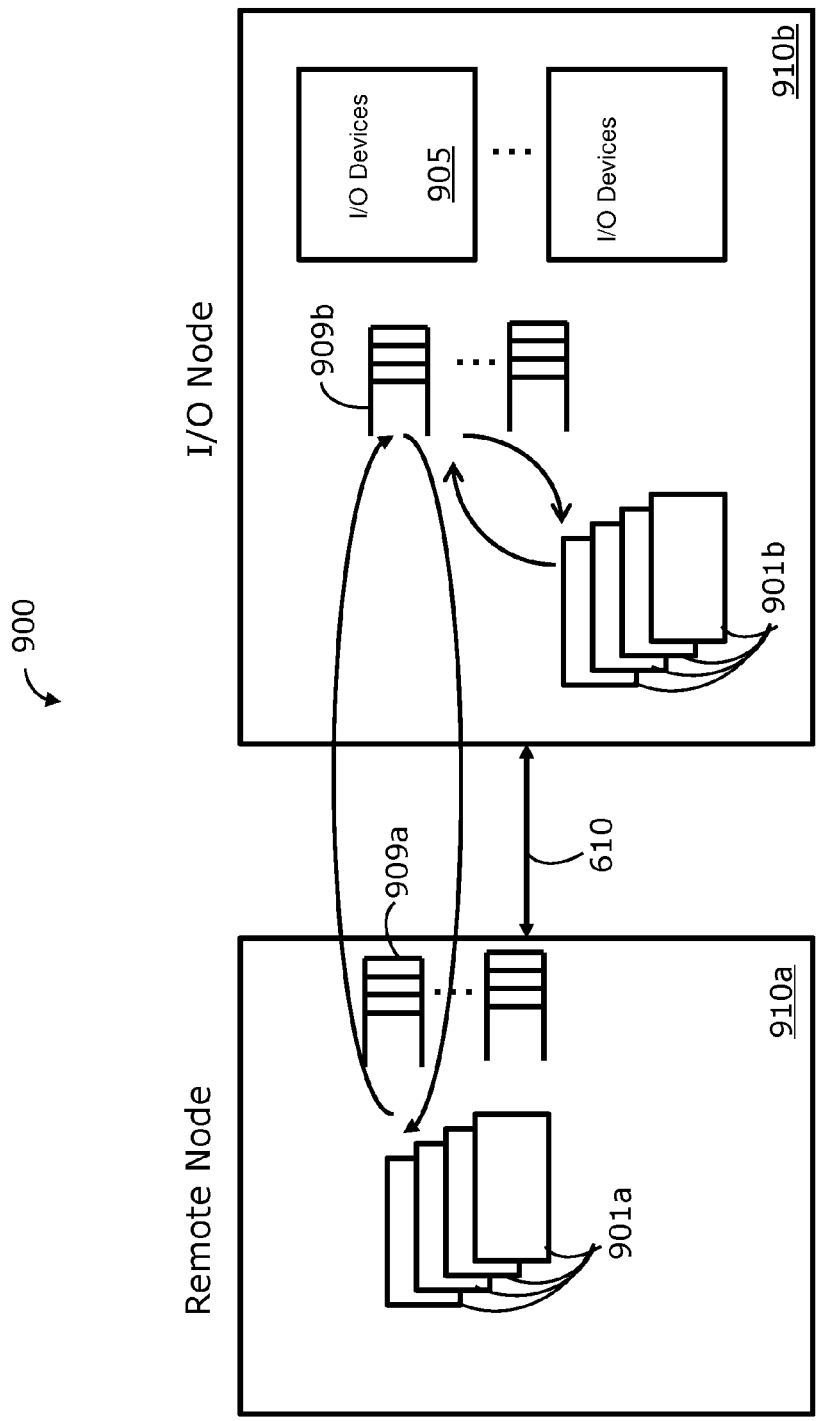
FIGS. 11A and 11B are diagrams illustrating two corresponding ordering scenarios, according to at least one example embodiment.
Figure 11B:
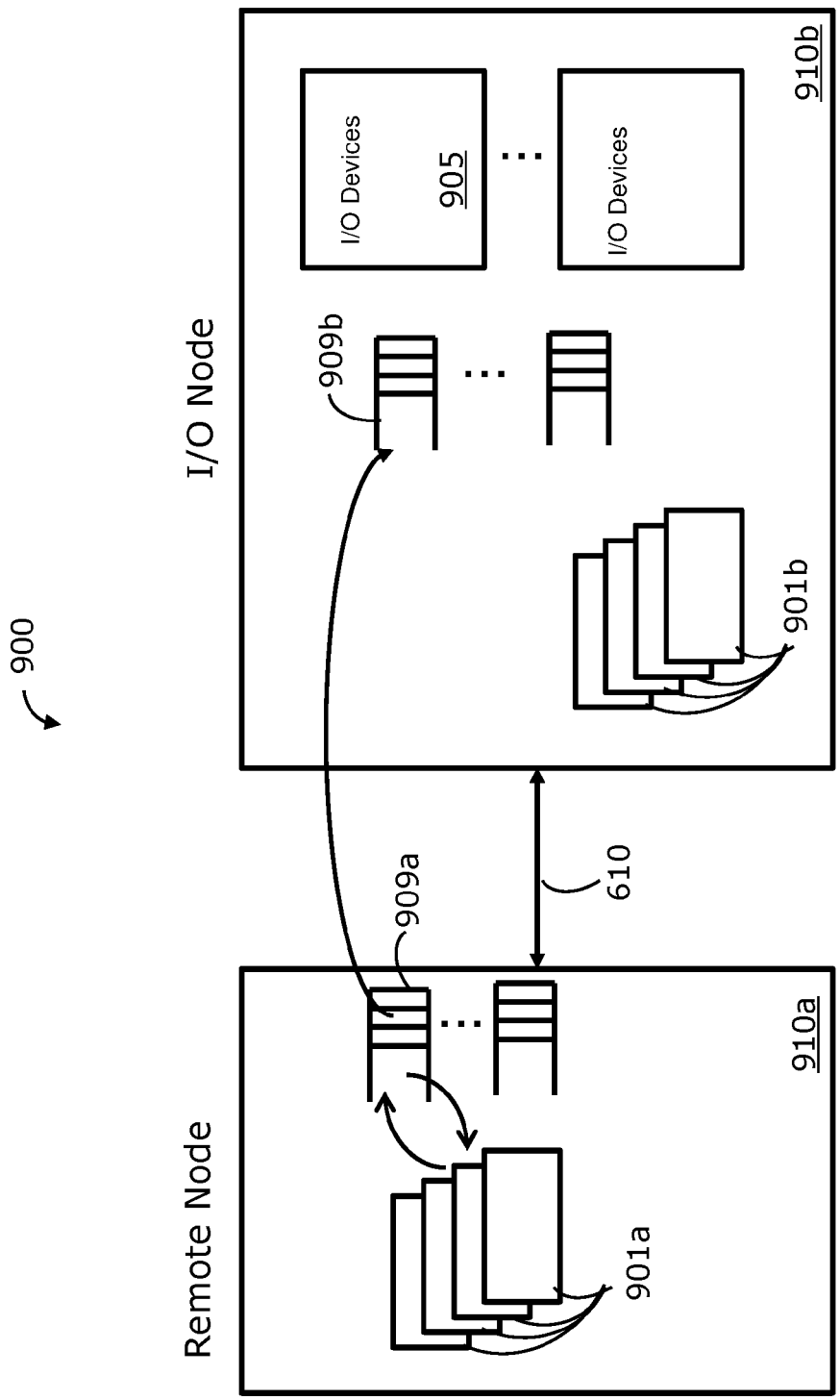

FIGS. 11A and 11B are diagrams illustrating two corresponding ordering scenarios, according to at least one example embodiment. FIG. 11A shows a global ordering scenario where cross-node acknowledgement, also referred to as global acknowledgement, is employed. According to at least one aspect, an I/O device 905 in the I/O node 910b is accessed by a core processor 901a of the remote node 910a and a core processor 901b of the I/O node 910b. In such case, the effective ordering point for access requests destined to the I/O device 905 is the queue 909b in the I/O node 910b.

The effective ordering point is the queue issuing queuing acknowledgement(s). For the core processor(s) 901*b*, in the I/O node 910*b*, the effective ordering point is local as both the cores 901*b* and the effective ordering point reside in the I/O node 910*b*. However, for core processor(s) 901*a* in the remote node 910*a*, the effective ordering point is not local, and any queuing acknowledgement sent from the effective queuing point 909*b* to the core processor(s) 901*a* in the remote node involves inter-node communication.

FIG. 11B shows a scenario of local ordering scenario, according to at least one example embodiment. According to at least one aspect, all core processors 901*a*, accessing a given I/O device 905, happen to reside in the same remote node 910*a*. In such case a local queue 909*a* is the effective ordering point for ordering access requests destined to the I/O device 905. In other words, since all access requests destined to the I/O device 905 are initiated by agents within the remote node 910*a*, then once such requests are queued within the queue 909*a*, the requests are then served according to their order in the queue 909*a*. As such, there is no need for acknowledgement(s) to be sent from the corresponding queue 909*b* in the I/O node. By designing the ordering operation in a way that core processors 901*a* do not wait for acknowledgement(s) from the queue 909*a* speeds up the process of ordering access requests in this scenario. As such, only local acknowledgements, from the local effective ordering point 909*a*, are employed.

According to at least one example embodiment, in the case of a local-only ordering scenario, no acknowledgment is employed. That is, agents within the remote node 910*a* do not wait for, and do not receive, an acknowledgement when initiating an access request to the given I/O device 905. The agents simply assume that that an initiated access request is successfully queued in the local effective ordering point 9909*a*.

According at least one other example embodiment, local acknowledgement is employed in the local-only ordering scenario. According to at least one aspect, multiple versions of the SYNCW operation are employed—one version is employed in the case of a local-only ordering scenario, and another version is employed in the case of a global ordering scenario. As such, all inter-node I/O accesses involve queuing acknowledgment being sent. However, in the case of a local-only ordering scenario, the corresponding SYNCW version may be designed in way that agents do not wait for acknowledgment to be received before initiating a new access request.

According to yet another example embodiment, a data field is used by a software running on the multi-node system 900 to indicate a local-only ordering scenario and/or a global ordering scenario. For microprocessor without interlocked pipeline stages (MIPS) chip device, the cache coherence attribute (CCA) may be used as the data field to indicate the type of ordering scenario. When the data field is used, agents accessing the given I/O device 905 adjust their behavior based on the value of the data field. For example, for given operation, e.g., write operation, two corresponding commands—one with acknowledgement and another without—may be employed, and the data field indicates which command is to be used. Alternatively, instead of using the data field, two versions of the SYNCW are employed, with one version preventing any subsequent access operation from starting before an acknowledgement for a preceding access operation is received, and another version that does not enforce waiting for an acknowledgement for the preceding access operation. A person skilled in the art should appreciate that other implementations are possible.

According to at least one aspect, access requests include write requests, load requests, or the like. In order to further reduce the complexity of access operations in the multi-node system 900, inter-node I/O load operations, used in the multi-node system 900, are acknowledgement-free. That is, given that an inter-node queuing acknowledgement is already used, there is no need for another acknowledgement once the load operation is executed at the given I/O device.

Inter-Chip Interconnect Interface Protocol

Besides the chip device hardware architecture described above, an inter-chip interconnect interface protocol is employed by chip devices within a multi-node system. Considering an N-node system, the goal of the inter-chip interconnect interface protocol is to make the system appear as N-times larger, in terms of capacity, than individual chip devices. The inter-chip interconnect interface protocol runs over reliable point-to-point inter-chip interconnect interface links between nodes of the multi-node system.

According to at least one example embodiment, the inter-chip interconnect interface protocol includes two logical-layer protocols and a reliable link-layer protocol. The two logical layer protocols are a coherent memory protocol, for handling memory traffic, and an I/O, or configuration and status registers (CSR), protocol for handling I/O traffic. The logical protocols are implemented on top of the reliable link-layer protocol.

According to at least one aspect, the reliable link-layer protocol provides 16 reliable virtual channels, per pair of nodes, with credit-based flow control. The reliable link-layer protocol includes a largely standard retry-based acknowledgement/no-acknowledgement (ack/nak) protocol. According to at least one aspect, the reliable link-layer protocol supports 64-byte transfer blocks, each protected by a cyclic redundant check (CRC) code, e.g., CRC-24. According to at least one example embodiment, the hardware interleaves amongst virtual channels at a very fine-grained 64-bit level for minimal request latency, even when the inter-chip interconnect interface link is highly utilized. According to at least one aspect, the reliable link-layer protocol is very low-overhead enabling, for example, up to 250 Gbits/second effective reliable data transfer rate, in full duplex, over inter-chip interconnect interface links.

According to at least one example embodiment, the logical memory coherence protocol, also referred to as the memory space protocol, is configured to maintain cache coherence while enabling cross-node memory traffic. The memory traffic is configured to run over a number of independent virtual channels (VCs). According to at least one aspect, the memory traffic runs over a minimum of three VCs, which include a memory request (MemReq) channel, memory forward (MemFwd) channel, and memory response (MemRsp) channel. According to at least one aspect, no ordering is between VCs or within sub-channels of the same VC. In terms of memory addressing, a memory address includes a first subset of bits indicative of a node, within the multi-node system, and a second subset of nodes for addressing memory within a given node. For example, for a four-node system, 2 bits are used to indicate a node and 42 bits are used for memory addressing within a node, therefore resulting in a total of 44-bit physical memory addresses within the four-node system. According to at least one aspect, each node includes an on-chip sparse directory to keep track of cache blocks associated with a memory block, or line, corresponding to the node.

According to at least one example embodiment, the logical I/O protocol, also referred to as the I/O space protocol, is configured to handle access of I/O devices, or I/O traffic, across the multi-node system. According to at least one aspect, the I/O traffic is configured to run over two independent VCs including an I/O request (IOReq) channel and I/O response (IORsp) channel. According to at least one aspect, the IOReq VC is configured to maintain order between I/O access requests. Such order is described above with respect to FIGS. 9-11B and the corresponding description above. In terms of addressing of the I/O space, a first number of bits are used to indicate a node, while a second number of bits are used for addressing with a given node. The second number of bits may be portioned into two parts, a first part indicating a hardware destination and a second part representing an offset. For example, in a four-node system, two bits are used to indicate a node, and 44 bits are for addressing within a given node. Among the 44 bits, only eight bits are used to indicate a hardware destination and 32 bits are used as offset. Alternatively, a total of 49 address bits are used with 4 bits dedicated to indicating a node, 1 bit dedicated to indicating I/O, and the remaining bits dedicated to indicating a device, within a selected node, and an offset in the device.

Memory Coherence Protocol

As illustrated in FIG. 8 and the corresponding description above, each cache block, representing a copy of a data block, has a home node. The home node is the node associated with an external memory, e.g., DRAM, storing the data block. According to at least one aspect, each home node is configured to track all copies of its blocks in remote cache memories associated with other nodes of the multi-node system 600. According to at least one aspect, information to track the remote copies, or remote cache blocks, is held in the remote tags (RTG)—duplicate of the remote shared cache memory tags—of the home node. According to at least one aspect, home nodes are only aware of states of cache blocks associated with their data blocks. Since the RTGs at the home have limited space, the home node may evict cache blocks from a remote shared cache memory in order to make space in the RTGs.

According to at least one example embodiment, a home node tracks corresponding remotely held cache lines in its RTG. Information used to track remotely held cache blocks, or lines, includes states' information indicative of the states of the remotely held cache blocks in the corresponding remote nodes. The states used include an exclusive (E) state, owned (O) state, shared (S) state, invalid (I) state, and transient, or in-progress, (K) state. The E state indicates that there is only one cache block, associated with the data block in the external memory 790, exclusively held by the corresponding remote node, and that the cache block may or may not be modified compared to the data block in the external memory 790. According to at least one aspect, a sub-state of the E state, a modified (M) state, may also be used. The M state is similar to the E state, except that in the case of M state the corresponding cache block is known to be modified compared to the data block in the external memory 790.

According to at least one example embodiment, cache blocks are partitioned into multiple cache sub-blocks. Each node is configured to maintain, for example, in its shared memory cache 110, a set of bits, also referred to herein as dirty bits, on a sub-block basis for each cache block associated with the corresponding data block in the external memory attached to the home node. Such set of bits, or dirty bits, indicates which sub-blocks, if any, in the cache block are modified compared to the corresponding data block in the external memory 790 attached to the home node. Sub-blocks that indicated, based on the corresponding dirty bits, to be modified are transferred, if remote, to the home node through the inter-chip interconnect interface links 610, and written back in the external memory 790 attached to the home node. That is, a modified sub-block, in a given cache block, is used to update the data block corresponding to the cache block. According to at least one aspect, the use of partitioning of cache block provides efficiency in terms of usage of inter-chip interconnect interface bandwidth. Specifically, when a remote cache block is modified, instead of transferring the whole cache block, only modified sub-block(s) is/are transferred to other node(s).

According to at least one example embodiment, the O state is used when a corresponding flag, e.g., ROWNED_MODE, is set on. If a cache block is in O state in a corresponding node, then another node may have another copy, or cache block, of the corresponding data block. The cache block may or may not be modified compared to the data block in the external memory 790 attached to the home node.

The S state indicates that more than one node has a copy, or cache block, of the data block. The state I indicates that the corresponding node does not have a valid copy, or cache block, of the data block in the external memory attached to the home node. The K state is used by the home node to indicate that a state transition of a copy of the data block, in a corresponding remote node, is detected, and that the transition is still in progress, e.g., not completed. According to at least one example embodiment, the K state is used by the home node to make sure the detected transition is complete before any other operation associated with the same or other copies of the same data block is executed.

According to at least one aspect, state information is held in the RTG on a per remote node basis. That is, if one or more cache blocks, associated with the same data block, are in one or more remote node, the RTG will know which node has it, and the state of each cache block in each remote nodes. According to at least one aspect, when a node reads or writes a cache block that it does not own, e.g., corresponding state is not M, E, or O, it puts a copy of the cache block in its local shared cache memory 110. Such allocation of cache blocks in a local shared cache memory 110 may be avoided with special commands.

The logical coherent memory protocol includes messages for cores 201 and coprocessors 150 to access external memories 790 on any node 100 while maintaining full cache coherency across all nodes 100. Any memory space reference may access any memory on any node 100, in the multi-node system 600. According to at least one example embodiment, each memory protocol message falls into one of three classes, namely requests, forwards, and responses/write-backs, with each class being associated with a corresponding VC. The MemReq channel is configured to carry memory request messages. Memory request messages include memory requests, reads, writes, and atomic sequence operations. The memory forward (MemFwd) channel is configured to carry memory forward messages used to forward requests by home node to remote node(s), as part of an external or internal request processing. The memory response (MemRsp) channel is configured to carry memory response messages. Response messages include responses to memory request messages and memory forward messages. Also, response messages may include information indicative of status change associated with remote cache blocks.

Since the logical memory coherence protocol does not depend on any ordering within any of the corresponding virtual channels, each virtual channel may be further split into multiple independent virtual sub-channels. For example, the MemReq and MemRsp channels may be each split into two independent sub-channels.

According to at least one example embodiment, the memory coherence protocol is configured to operate according to out-of-order transmission in order to maximize transaction performance and minimize transaction latency. That is, home nodes of the multi-node system 600 are configured to receive memory coherence protocol messages in an out-of-order manner, and resolve discrepancy due to out-of-order reception of messages based on maintained states of remote cache blocks in information provided, or implied, by received messages.

According to at least one example embodiment, a home node for data block is involved in any communication regarding copies, or cache blocks, of the data block. When receiving such communications, or messages, the home node checks the maintained state information for the remote cache blocks versus any corresponding state information provided or implied by received message(s). In case of discrepancy, the home node concludes that messages were received out-of-order and that a state transition in a remote node is in progress. In such case the home node makes sure that the detected state transition is complete before any other operation associated with copies of the same data block are executed. The home node may use the K state to stall such operation.

According to at least one example embodiment, the inter-chip interconnect interface sparse directory is held on-chip in the shared cache memory controller 115 of each node. As such, the shared cache memory controller 115 is enabled to simultaneously probe both the inter-chip interconnect interface sparse directory and the shared cache memory, therefore, substantially reducing latency for both inter-chip interconnect interface intra-chip interconnect interface memory transactions. Such placement of the RTG, also referred to herein as the sparse directory, also reduces bandwidth consumption since RTG accesses never consume any external memory, or inter-chip interconnect interface, bandwidth. The RTG eliminates all bandwidth-wasting indiscriminate broadcasting. According to at least one aspect, the logical memory coherence protocol is configured to reduce consumption of the available inter-chip interconnect interface bandwidth in many other ways, including: by performing, whenever possible, operations in either local or remote nodes, such as, atomic operations, by optionally caching in either remote or local cache memories and by transferring, for example, only modified 32-byte sub-blocks of a 128-byte cache block.

Table 1 below provides a list of memory request messages of the logical memory coherence protocol, and corresponding descriptions.

TABLE 1

| | | |
|---|---|---|
| Coherent Caching Memory Reads | | |
| RLDD | Remote Load Data | Read allocating into Requester L2. Requester L2 transitions to S or E depending on response. Response is PSHA or PEMD. |
| RLDI | Remote Load Instruction | Read allocating into Requester L2. Requester L2 transitions to S only. Response is PSHA. |
| RLDC | Remote Load Shared into cache(s) | Read allocating into L2 of both Requester & Home. Requester L2 transitions to S only. Response is PSHA. |
| Coherent Non-Caching Memory Reads | | |
| RLDT | Remote Load Immediate | Read not allocating into Requester L2. Response is PSHA. Does not allocate in L2 at the home node either. |
| RLDY | Remote Load Immediate. Allocate in Home node | Read not allocating into Requester L2. Response is PSHA. Desires to allocate in L2 at the home node. |
| RLDWB | Remote Load Immediate, and do not Write Back | Read not allocated into any L2, e.g., data not going to be used anymore. Clear Dirty Bits (modified bits) if convenient (no need to write back). Change LRU to replace first if possible. Response is PEMD. |
| Coherent Caching Memory Write. Transitioning the cache line to M. Can transition to E, if previous data is irrelevant | | |
| RLDX | Remote Load Exclusive (intent to modify) | Load allocating into Requester L2 as E. Response is PEMD and 0+ PACK's. The field dmask[3:0] indicates the lines that are requested. It is usually all 1's except if the whole line is modified, then dmask[3:0] = 0. |
| RC2DO | Remote Change to Dirty - Line is O | Request to change Requester L2 line state from O to E. Response is a (PEMN or PACK) and 0+ PACK if still in O/S state at home RTG, else if invalidated response is PEMD and 0+ PACK's (i.e. home will effectively have morphed it into an RLDX). |
| RC2DS | Remote Change to Dirty - Line in S | Request to change Requester line state from S to E. Response is (PEMN or PACK) and 0+ PACK if still in S at home RTG, else if invalidated, response is PEMD and 0+ PACK's (i.e. home will effectively have morphed it into an RLDX). |
| Coherent Non-Caching Memory Write—Writing directly to memory | | |
| RSTT | Remote Store Immediate | Full cache block store without allocating into any L2 - Response is PEMN. Uses the field dmask [3:0] to indicate the sub-lines being transferred with one bit for each sub-line. |
| RSTY | Remote Store Immediate. Allocate in Home node | Same as RSTT but allocates in Home L2 if possible. Response is a single PEMN. |
| RSTP | Store partial | Partial store to home memory without allocating into Requester L2. Response is PEMN. |
| Coherent Non-Caching Atomic Memory Read/Write—Writing directly to memory | | |
| RSAA | Atomic Add, 64/32 | Increment memory (do not return data). Response is PEMN. |
| RSAAM1 | Atomic Decrement by 1, 64/32 | Decrement memory by 1 (do not return data). Response is PEMN |
| RFAA | Atomic Fetch and Add, 64/32 | Response is PATM. Return the current value and atomically add the value provided at the memory location. |
| RINC | Atomic increment, 64/32/16/8 | Response is PATM. Return the current value and atomically add 1 at the memory location. |
| RDEC | Atomic decrement, 64/32/16/8 | Response is PATM. Return the current value and atomically subtract 1 at the memory location. |
| RFAS | Atomic Fetch and swap 64/32 | Response is PATM. Return the current value and atomically store the value provided in the memory location. |
| RSET | Atomic Fetch and Set, 64/32/16/8 | Response is PATM. Return the current value and atomically set all the bits in the memory location. |
| RCLR | Atomic fetch and Clear, 64/32/16/8 | Response is PATM. Return the current value and atomically clear all the bits in the memory location. |
| Special ops | | |
| RCAS | Atomic Compare and swap, 64/32/16/8 Line I | Response is PATM. Return the current value and atomically compare memory location to the "compare value", and if equal write the "swap value" into the memory location. The first value provided is the "swap |

TABLE 1-continued

| | | |
|---|---|---|
| RCASO | not allocating Atomic Compare and swap, 64/32/16/8 | value", the second is the "compare value".

Compare and swap (and the compare has matched but state is O at the requester). Response is either PEMD.N (transition to E & perform swap), or PEMD.D (transition to E and perform the compare/swap locally), or PSHA.D (compare passed at home and swap performed) or P2DF.D (swap failed at home, and swap not performed). The state transitions to S for either PSHA.D or P2DF.D. |
| RCASS | Atomic Compare and swap, 64/32/16/8 | Compare and swap (and the compare has matched but state is S at the requester). Response is either PEMD.N (transition to E & perform swap), or PEMD.D (transition to E and perform the compare/swap locally), or PSHA.D (compare passed at home and swap performed) or P2DF.D (swap failed at home, and swap not performed). The state transitions to S for either PSHA.D or P2DF.D. |
| RCASI | Atomic Compare and swap, 64/32/16/8 Line I allocating | Compare and swap (and the compare and state is I at the requester). Response is either PEMD.D (transition to E and perform the compare/swap locally), PSHA.D (compare passed at home and swap performed) or P2DF.D (swap failed at home, and swap not performed). The state transitions to S for either PSHA.D or P2DF.D. |
| RSTC | Conditional Store - Line I not allocating | Special operation to support LL/SC commands - Return the current value and atomically compare memory location to the "compare value", and if equal write the "swap value" into the memory location. The first value provided is the "swap value", the second is the "compare value". Response is PSHA.N in case of pass, or P2DF.N in case of fail. |
| RSTCO | Conditional Store - Line O | Special operation to support LL/SC commands - The compare value matched the cache, but state O. Response is either PEMD.N (transition to E, perform swap), or PEMD.D (transition to E and perform the compare/swap locally), or PSHA.D (compare passed at home and swap performed) or P2DF.D (swap failed at home, and swap not performed). The state transitions to S for either PSHA.D or P2DF.D. |
| RSTCS | Conditional Store - Line S | Special operation to support LL/SC commands - The compare value matched the cache, but state S. Response is either PEMD.N (transition to E, perform swap), or PEMD.D (transition to E and perform the compare/swap locally), or PSHA.D (compare passed at home and swap performed) or P2DF.D (swap failed at home, and swap not performed). The state transitions to S for either PSHA.D or P2DF.D. |
| RSTCI | Conditional Store - Line I but allocating | Special operation to support LL/SC commands - Response is either PEMD.D (transition to E and perform the compare/swap locally), PSHA.D (compare passed at home and swap performed) or P2DF.D (swap failed at home, and swap not performed). The state transitions to S for either PSHA.D or P2DF.D. |

Table 2 below provides a list of memory forward messages of the logical memory coherence protocol, and corresponding descriptions.

TABLE 2

| | Forwards (description gives no conflict responses) | |
|---|---|---|
| FLDRO.E FLDRO.O | Forward Read Data-ROWNED_MODE = 1 | Forward for RLDD/RLDI when ROWNED MODE = 1. Respond to requester with PSHA and to home with HAKN, transition to O (or remaining in O). Two flavors exist: .E & .O depending on home RTG state. FLDRO.O used for RLDT/RLDY when home RTG state is O & FLDT_WRITEBACK = 0. |
| FLDRS.E FLDRS.O | Forward Read Data-ROWNED_MODE = 0 | Forward for RLDD/RLDI when ROWNED_MODE = 0, respond to requester with PSHA and to home with HAKD (transition to S). Two flavors exist, .E & .O depending on home RTG state. Used also for RLDT/RLDY when FLDT_WRITEBACK = 1. |
| FLDRS_2H.E FLDRS_2H.O | Forward Home Read data | Forward for Home internal read data, respond to home with HAKD (transition to S). Two flavors exist, .E & .O depending on home RTG state. Used for all non-exclusive internal home reads (caching & non-caching). |
| FLDT.E | Forward Read Through | Forward for RLDT/RLDY when FLDT_WRITEBACK = 0 and home RTG state is E. Remote remains in E unless cache line is clean, then downgrade to S. Respond to requester with PSHA and to home with either HAKN (if remaining in E i.e. cache line is dirty), or HAKNS (if downgrading to S). Note: if home RTG is O, FLDRO.O is used. |
| FLDX.E FLDX.O | Forward Read Exclusive | Forwarded RLDX, respond to requester with PEMD and to home with HAKN (transition to I), includes the number of PACKs the requester should expect. Two flavors exist, .E & .O depending on home RTG state. Used also for RLDWB. The field dmask[3:0] is used to indicate which of the cache sub-lines are being requested. |
| FLDX_2H.E FLDX_2H.O | Forward Home Read exclusive | Forward for Home internal read data exclusive (Home intends to modify data), respond to Home with HAKD. Two flavors |

TABLE 2-continued

Forwards (description gives no conflict responses)

| | | |
|---|---|---|
| | | exist, .E & .O depending on home RTG state. Also used by home when processing remote partial write requests (RSTP) and remote Atomic requests. The field dmask[3:0] is used to indicate which of the cache sub-lines are being requested. |
| FEVX_2H.E FEVX_2H.O | Forward for Home Eviction | Forward for when home is evicting cache line in its RTG (i.e. evicting the line from remote caches that are in E or O. Respond to home with VICHI. Two flavors exist, .E & .O depending on home RTG state. |
| SINV | Shared invalidate | Forward to invalidate shared copy of line. Respond with PACK to requester and HAKN to Home, includes the number of PACKs the requester should expect. |
| SINV_2H | Shared Invalidate Home is requester | Invalidate shared copy respond with HAKN to Home. |

Table 3 below provides a list of example memory response messages of the logical memory coherence protocol and corresponding descriptions.

TABLE 3

VICs

| | | |
|---|---|---|
| VICD | Vic from E or O to I | Remote L2 evicting line from its cache to home. Remote L2 was in E or O state, now I. No response from home. dmask[3:0] indicates which of the cache sub-lines are being transferred . . . VICN or VICD.N correspond to the case where dmask[3:0] = 0 (no data is being transferred, because whole cache line was not modified). |
| VICC | Vic from E or O to S | Used to indicate that Remote L2 is downgrading its state from E or O to S, e.g., updating memory with his modified data (if any) but keeping a shared copy. No response from home. The dmask[3:0] indicates which of the cache sub-lines are being transferred. VICE or VICC.N correspond to the case where dmask[3:0] = 0 (no data is being transferred, because whole line was clean). |
| VICS | Vic from S to I | Remote L2 evicting home it has evicted a cache line that was shared. Remote was in S state, now I. No response from home |

HAKs (Home acknowledge)

| | | |
|---|---|---|
| HAKD | To Home Ack | Acknowledge to home for forwards like FLDRx/FEVT/FLDX_2H/ . . . dmask[3:0] indicates which of the cache sub-lines are being transferred. HAKN or HAKD.N is a synonym for the dmask[3:0] = 0 case (no data is being transferred, because whole line was clean, or no data was requested). |
| HAKNS | To Home Ack, state is S | Acknowledge to home for FLDRx if transitioning from E or S & cache line was clean (no data is transferred but remote is transitioning to S) |
| HAKI | To Home Ack —VICx in proress | Acknowledge to home saying that the remote node received the forward (Fxxx), but the current state is I (instead of the expected E or O because there are some VICs in transit). Home needs to complete cycle. |
| HAKS | To Home Ack—VICx in progress | Acknowledge to home saying that the remote node received a forward (Fxxx), but the current state is S (instead of the expected E or O because there are some VICs in transit). Home needs to complete cycle |
| HAKV | To Home Ack—VICS in progress | Acknowledge to home saying that the remote node received the SINV, but the state was I (instead of the expected S because there is a VICS in transit). Home does not need to complete cycle (Requester acknowledged the other remote if needed) |

Merged commands —as optimization

| | | |
|---|---|---|
| VICDHI | Home forced VICD | Response t FEVX_2H—effectively a combination of VICD + HAKI |

PAKs (Requester acknowledge—positive and negative)

| | | |
|---|---|---|
| PSHA | Response w Data—to S/I | Response for a caching request (RLDD/RLDI), will carry full cache line, and state will transition to S. For non-caching request (RLDY/RLDT/RLDWB) it carries any number from 1 to 4 of the 4 cache sub-lines that constitute a full cache line. State remains I. |
| PEMD | Response to request, from "owning node" | Response from owning node (remote if they are E or O, else home). Caching requests will transition to E, non-caching remain in I. dmaks[3:0] indicates which cache sub-line are being provided. Includes # of PACK's the requester should expect. PEMN or PEMD.N correspond to the case where dmask[3:0] = 0 (no data is being transferred, because no data was needed/requested). |
| PATM | Response with Data— (Atomic Requests) | Response for atomic operation carries 1 or 2 64-bit words. |
| PACK | Response Ack (without data) | (Shared invalidate acknowledge from SINV/SINV2H—includes # of PACK's the requester should expect |
| P2DF | Response Fail | failure response to RSTCO/RSTCS |

Requester done: Requester has completed the command

| | | |
|---|---|---|
| DONE | Requester DONE | Requester Done. |

Error Response

| | | |
|---|---|---|
| PERR/HERR | Response Error | Reserved—Could be used communicate errors/exceptions (for example: an out of range address) |

Table 4 below provides a list of example fields, associated with the memory coherence messages, and corresponding descriptions.

TABLE 4

| Field | Name | Comment |
|---|---|---|
| Cmd[4:0] | Command/Op | These bits are used to identify the current packet with a VC (and correspondingly, its format). They are unique within a single VC. Very few commands will get assigned two consecutive encoding, so as to have an "extra" bit for these commands to use (see IOBOP1/IOBOP2). |
| RReqId[4:0] | Remote Requester ID | This is effectively the "tag" to be generated by the Remote requester for Memory requests (that requires responses). This and the ReqUnit are returned in the response to route & identify the original transaction. |
| HReqId[5:0] | Home Requester ID | This is similar to RReqId, but it is one bit wider, and is used when the home is the requester (both for Request & forwards). |
| IReqId[5:0] | IO Request ID | This is the Requester ID for IO operation. It is the same size for home & remote requests. There is no ReqUnit attached to this. |
| ReqUnit[3:0] | Request Unit | Identify the Unit that issued the request for memory transactions. This is derived from some address bits (directly or through some hash function, bit either way it should be the same on all nodes, mechanism is TBD). Packets without address fields (usually responses) require this field to help identify the requesting transaction with HReqId or RReqId. |
| ReqNode[2:0] | Request Node | Used in forwards to tell remote which node it should send the response to (when the requester is a remote node). Note that requests and responses do not need this field, since the OCI connection is point to point. |
| A[41:0] A[41:7] | Memory addresses | Indicate address fields for memory transactions. The address fields are either 41:7 for transactions that are 128 byte aligned, or 41:0 for transaction that require byte addressing. |
| A[35:3] A[35:0] | IO addresses | Indicate address fields for IO transactions. The address fields are either 35:3 for transactions that are 8 byte aligned, or 35:0 for transaction that require byte addressing. |
| dmask[3:0] | Data Mask | For write requests & data responses to identify which sub-cache block (32-block) is being provided. For example if the mask bits are b1001, on a response, it indicates that bytes 0-32 & bytes 96-127 are being provided in the subsequent data beats. None to any combination the 4 sub-cache blocks are supported. * For non-caching read request, or invalidating reads, (and their corresponding forwards), to request any combination of 4 sub-cache blocks (32-bytes) are being requested. At least one bit should be set, and any combination of the 4 sub-cache block sizes is supported. * For invalidating read request (i.e. RLDX), and their corresponding forwards, where no-data is needed, or only partial data is needed, to request only request the data that is not being overridden (in 4 sub-cache block resolution). No bit set is a valid option for these cycles. |
| dirty[3:0] | Dirty sub-blocks | This Field is used on responses, in particular PEMD & PEMN, to identify to the requester which sub-block is "dirty" (modified) and needs to be written back to memory. This is used in cases when the Requester is transitioning from I/S to E/M (in particular if the node is O it knows what sub-block(s) is/are dirty). If any dirty bits are set, the requester should transition to M (not to E). Home node does not send a PEMN/PEMD with any dirty bit set (it writes to memory any dirty lines first). |
| PackCnt[2:0] | PACK count | This Field have the number of response a requester is to expect, 0 = 1 response, 1 = 2 responses, 2 = 3 responses, 3 = 4 responses, (4 & above are reserved). Currently with a 4 node system, the max PackCnt should be 2 (i.e. 3 responses). |
| DID[7:0] | IO Destination ID | I/O Destination ID |
| Sz[2:0] | Read or Write Size | The size of transaction, 0 = 1 byte, 1 = 2 bytes, 2 = 4 bytes, 3 = 8 bytes (bit 2 is currently reserved, for a possible extension to 16 bytes in that case 4 = 16 bytes the rest reserved). |
| RspSz[1:0] | Response Size (for PATM) | The size of transaction, 0 = 1 64 bit word, 1 = 2 64 bit words (128 bits), (remaining reserved, for a possible extension). |
| LdSz[3:0] StSz[3:0] | IO Load & Store sizes | These are for IO Requests & Responses load and/or store sizes in QWords (8 bytes) quantities. Values can range 0x0 to )xF and map to sizes of 1 to 16 QWords (0x0 = 1 Qword, 0x1 = 2 QWords, ... 0xF = 16 QWords). |
| IOBOP1D[59:0] | IOB op 1 | Unique data for IOBOP1 (This is one of the commands that require a 4 bit command field) |
| IOBOP2D[123:0] | IOB op 2 | Unique data for IOBOP2 (This is one of the commands that require a 4 bit command field) |

A person skilled in the art should appreciate that the lists in the tables below are provided for illustration purposes. The lists are not meant to represent complete sets of messages or message fields associated with the logical memory coherence protocol. A person skilled in the art should also appreciate that the messages and corresponding fields may have different names or different sizes than the ones listed in the tables above. Furthermore, some or all of the messages and field described above may be implemented differently.

Figure 12:
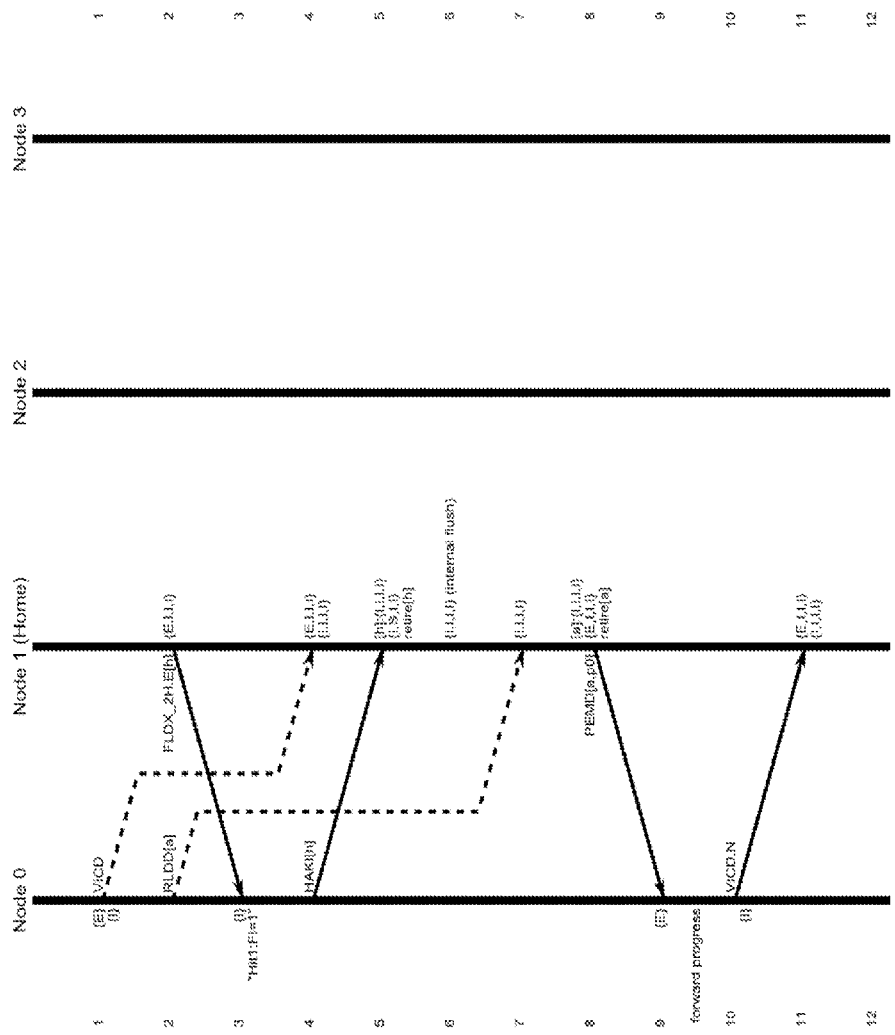
FIG. 12 is a flow diagram illustrating a first scenario of out-of-order messages exchanged between a set of nodes in a multi-node system, according to at least one example embodiment.

FIG. 12 is a flow diagram illustrating a first scenario of out-of-order messages exchanged between a set of nodes in a multi-node system, according to at least one example embodiment. In FIG. 12, a multi-node system includes four nodes, e.g., node 0-3, and node 1 is the home node for a data block with a corresponding copy, or cache block, residing in node 0 (remote node). Node 0, first, sends a memory response message, e.g., VICD, to the home node (node 1) indicating a state transition, form state E to state I, or eviction of the cache block it holds. Then node 0 sends a memory request message, e.g., RLDD, to the home node (node 1). Before receiving a response to its memory request message, node 0 receives a forward message, e.g., FLDX_2H.E(h), from the home node (node 1) requesting the cache block held by node 0. The forward message indicates that when such message was sent, the home node (node 1) was not aware of the eviction of the cache block by node 0. According to at least one aspect, node 0 is configured to set one or more bits in its inflight buffer 521 to indicate that a forward message was received and indicate its type. Such bits allow node 0 to determine (1) if the open transaction has seen none, one, or more forwards for the same cache block, (2) if the last forward seen is a SINV or a Fxxx type, (3) if type is Fxxx, then is it a .E or .O, and (4) if type is Fxxx then is it invalidating, e.g., FLDX, FLDX_2H, FEVX_2H, . . . etc., or non-invalidating, e.g., FLDRS, FLDRS_2H, FLDRO, FLDT, . . . etc.

After sending the forward message, e.g., FLDX_2H.E(h), the home node (node 1) receives the VICD message from node 0 and realizes that the cache block in node 0 was evicted. Consequently, the home node updates the maintained state for the cache block in node 0 from E to I. The home node (node 1) also changes a state of a corresponding cache block maintained in its shared cache memory 110 from state I to state S, upon receiving a response, e.g., HAKI(h), to its forward message. The change to state S indicates that now the home node stores a copy of the data block in its local shared cache memory 110. Once, the home node (node 1) receives the memory request message, RLDD, from node 1, it responds back, e.g., PEMD, with copy of the data block, changes the maintained state for node 0 from I to E, and changes its state from S to I. That is, the home node (node 1) grants an exclusive copy of the data block to node 0 and evicts the cache block in its shared cache memory 110. When receiving the PEMD message, node 0 may release the bits set when the forward message was received from the home node. The response, e.g., VICD.N, results in a change of the state of node 0 maintained at the home node from E to I.

Figure 13:
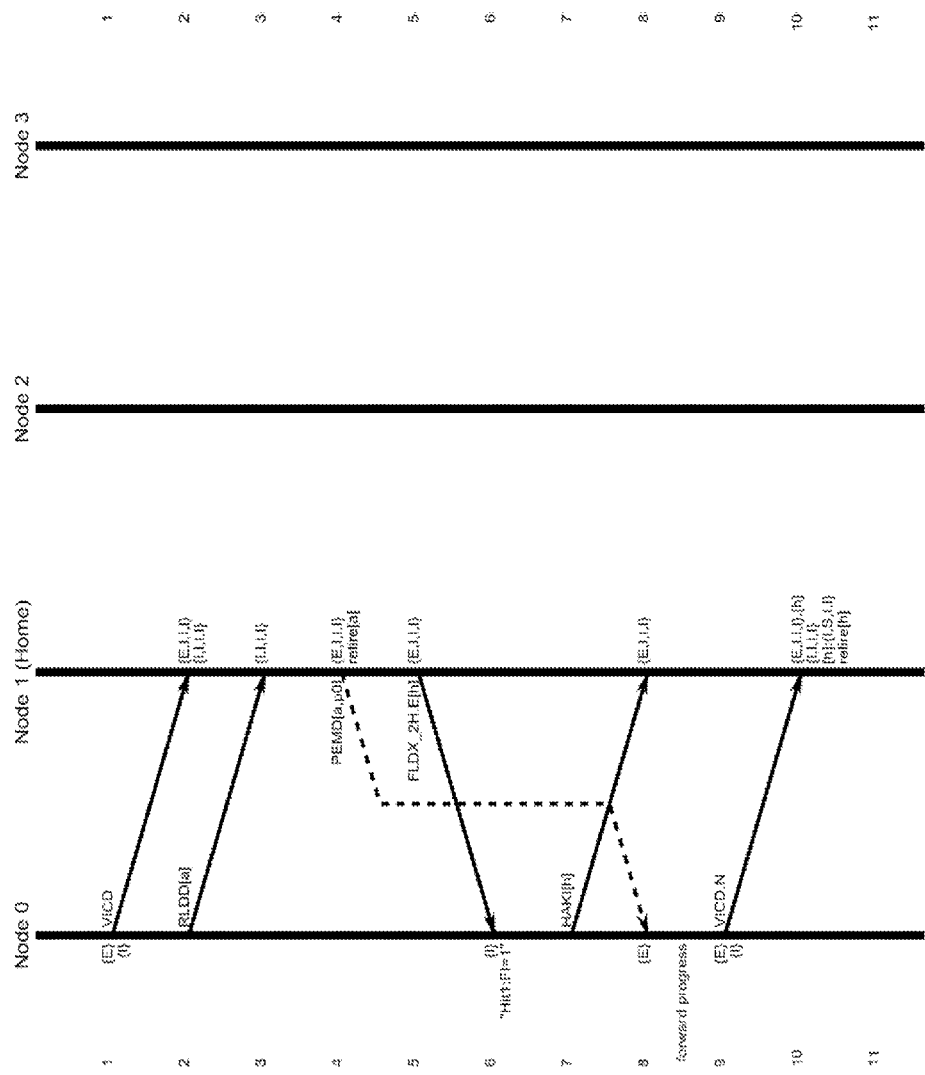
FIG. 13 is a flow diagram illustrating a second scenario of out-of-order messages exchanged between a set of nodes in a multi-node system, according to at least one example embodiment.

FIG. 13 is a flow diagram illustrating a second scenario of out-of-order messages exchanged between a set of nodes in a multi-node system, according to at least one example embodiment. In the scenario of FIG. 13, the home node (node 1) receives the RLDD message from node 0 and responds, e.g., PEMD, to it by granting node 0 an exclusive copy of the data block. The state for node 0 as maintained in the home node (node 1) is changed to E when PEMD is sent. Subsequently, the home node (node 1) sends a forward message, FLDX_2H.E(h), to node 0. However, node 0 receives the forward message before receiving the PEMD response message from the home node. Node 0 responds back, e.g., HAKI, to the home node (node 1) when receiving the forward message to indicate that it does not have a valid cache block. Node 0 also sets one or more bits in its in-flight buffer 521 to indicate the receipt of the forward message from the home node (node 1).

When the PEMD message is received by node 0, node 0 first changes it local state to E from I. Then, node 0 responds, e.g., VICD.N, back to the previously received FLDX_2H.E message by sending the cache block it holds back to the home node (node 1), and changes its local state for the cache block from E to I. At this point, node 0 releases the bits set in its in-flight buffer 521. Upon receiving the VICD.N message, the home node (node 1) realizes that node 0 received the PEMD message and that the transaction is complete with receipt of the VICD. N message. The home node (node 1) changes the maintained state for node 0 from E to I.

Figure 14:
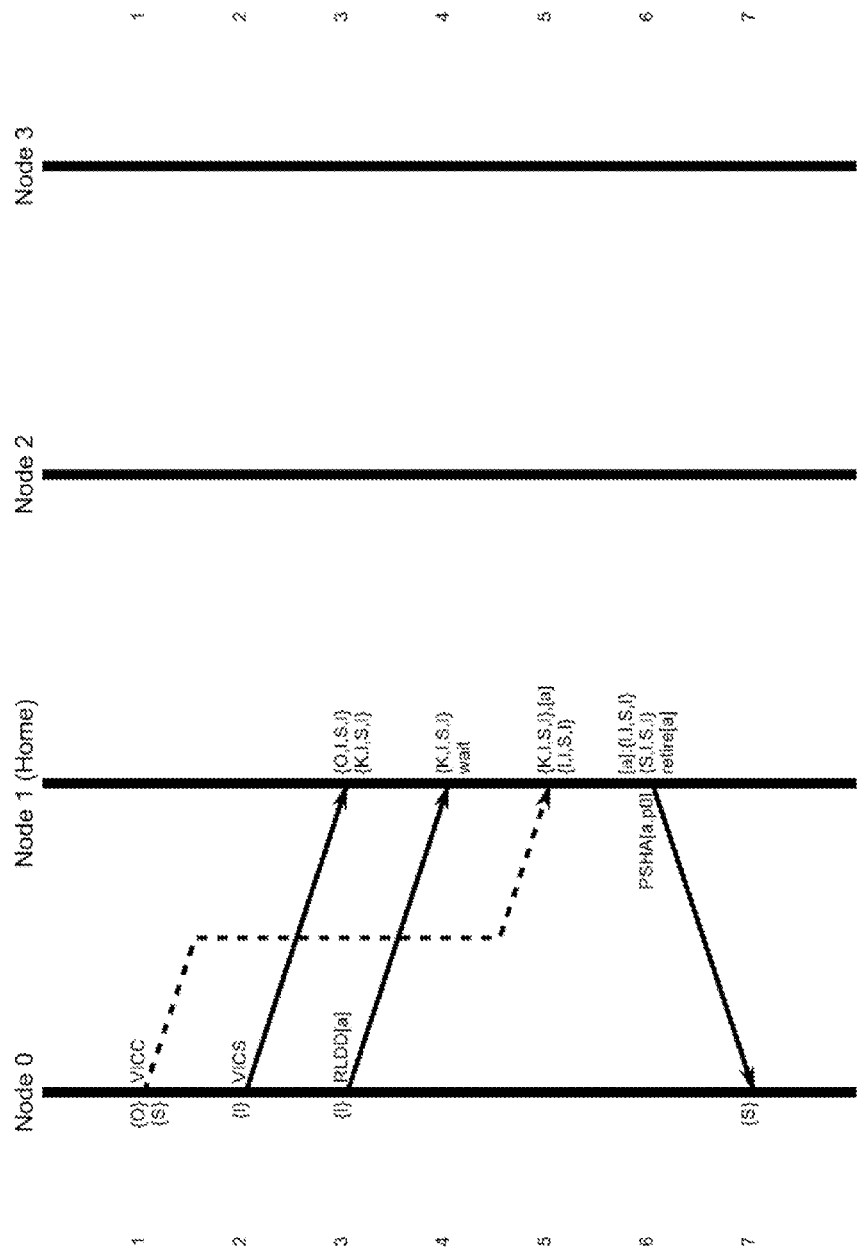
FIG. 14 is a flow diagram illustrating a third scenario of out-of-order messages exchanged between a set of nodes in a multi-node system, according to at least one example embodiment.

FIG. 14 is a flow diagram illustrating a third scenario of out-of-order messages exchanged between a set of nodes in a multi-node system, according to at least one example embodiment. Node 0, a remote node, sends a VICC message to the home node (node 1) to indicate a downgrade in the local state of a cache block it holds from state O to state S. Then, node 0 sends a VICS message to the home node (node 1) indicating eviction, state transition to I, of the cache block. Later, the same node (node 0) sends a RLDD message to the home node (node 1) requesting a copy of the data block. The VICC, VICS, and RLDD messages are received by the home node (node 1) in different order than the order according to which they were sent by node 0. Specifically, the home node (node 1) receives the VICS message first. At this stage, the home node realizes that there is discrepancy between the state, maintained at the home node, of the cache block held by node 0, and the state for the same cache block indicated by the VICS message received.

The VICS message received indicates that the state, at node 0, of the same cache block is S, while the state maintained by the home node (node 1) is indicative of an O state. Such discrepancy implies that there was a state transition, at node 0, for the cache block, and that the corresponding message, e.g., VICC, indicative of such transition is not received yet by the home node (node 1). Upon receiving the VICS, the home node (node 1) changes the maintained state for node 0 from O to K to indicate that there is a state transition in progress for the cache block in node 0. The K state makes the home node (node 1) wait for such state transition to complete before allowing any operation associated with the same cache at node 0 or any corresponding cache blocks in other nodes to proceed.

Next, the home node (node 1) receives the RLDD message from node 0. Since the VICC message is not received yet by the home node (node 1)—the detected state transition at node 0 still in progress and not completed—the home node keeps the state K for node 0 and keeps waiting. When the VICC message is received by the home node (node 1), the home node changes the maintained state for node 0 from K to I. Note that the VICC and VICS messages together indicate state transitions from O to S, and then to I. The home node (node 1) then responds back, e.g., with PSHA message, to the RLDD message by sending a copy of the data block to node 0, and changing the maintained state for node 0 from I to S. At this point the transaction between the home node (node 1) and node 0 associated with the data block is complete.

Figure 15:
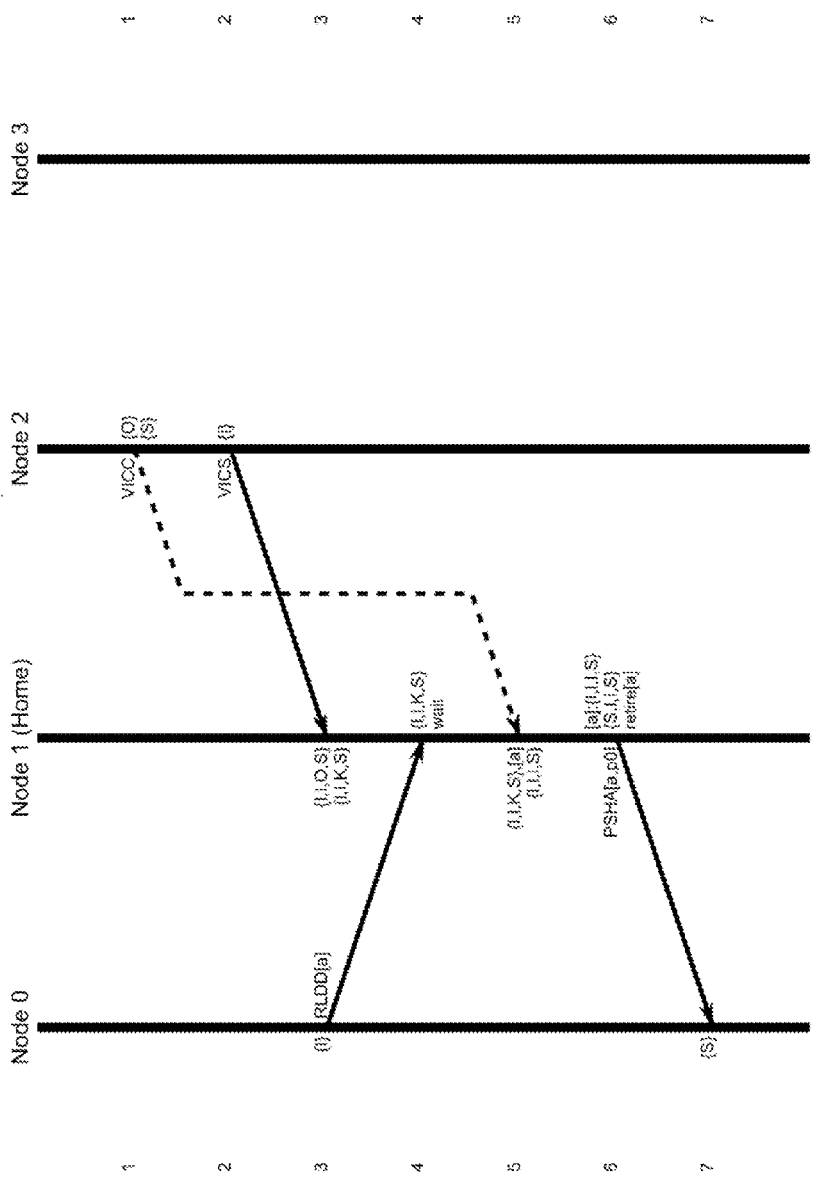
FIG. 15 is a flow diagram illustrating a fourth scenario of out-of-order messages exchanged between a set of nodes in a multi-node system, according to at least one example embodiment.

FIG. 15 is a flow diagram illustrating a fourth scenario of out-of-order messages exchanged between a set of nodes in a multi-node system, according to at least one example embodiment. In this scenario, remote nodes, node 0 and node 2, are both engaged in transactions associated with cache blocks corresponding to a data block of the home node (node 1). Node 2 sends a VICC message then a VICS message indicating, respectively, a local state transition from O to S and a local state transition from S to I for a cache block held by node 2. The home node (node 1) receives the VICS message first, and in response changes the maintained state for node 2 from O to K Similar to the scenario in FIG. 14. The home node (node 1) is now in wait mode. The home node then receives a RLDD message from node 0 requesting a copy of the data block. The home node stays in wait mode and does not respond to the RLDD message.

Later, the home node receives the VICC message sent from node 2. In response, the home node (node 1) changes the maintained state for node 2 from K to I. The home node (node 1) then responds back to the RLDD message from node 0 by sending a copy of the data block to node 0, and changes the maintained state for node 0 from I to S. At this stage the transactions with both node 0 and node 2 are complete.

Figure 16:
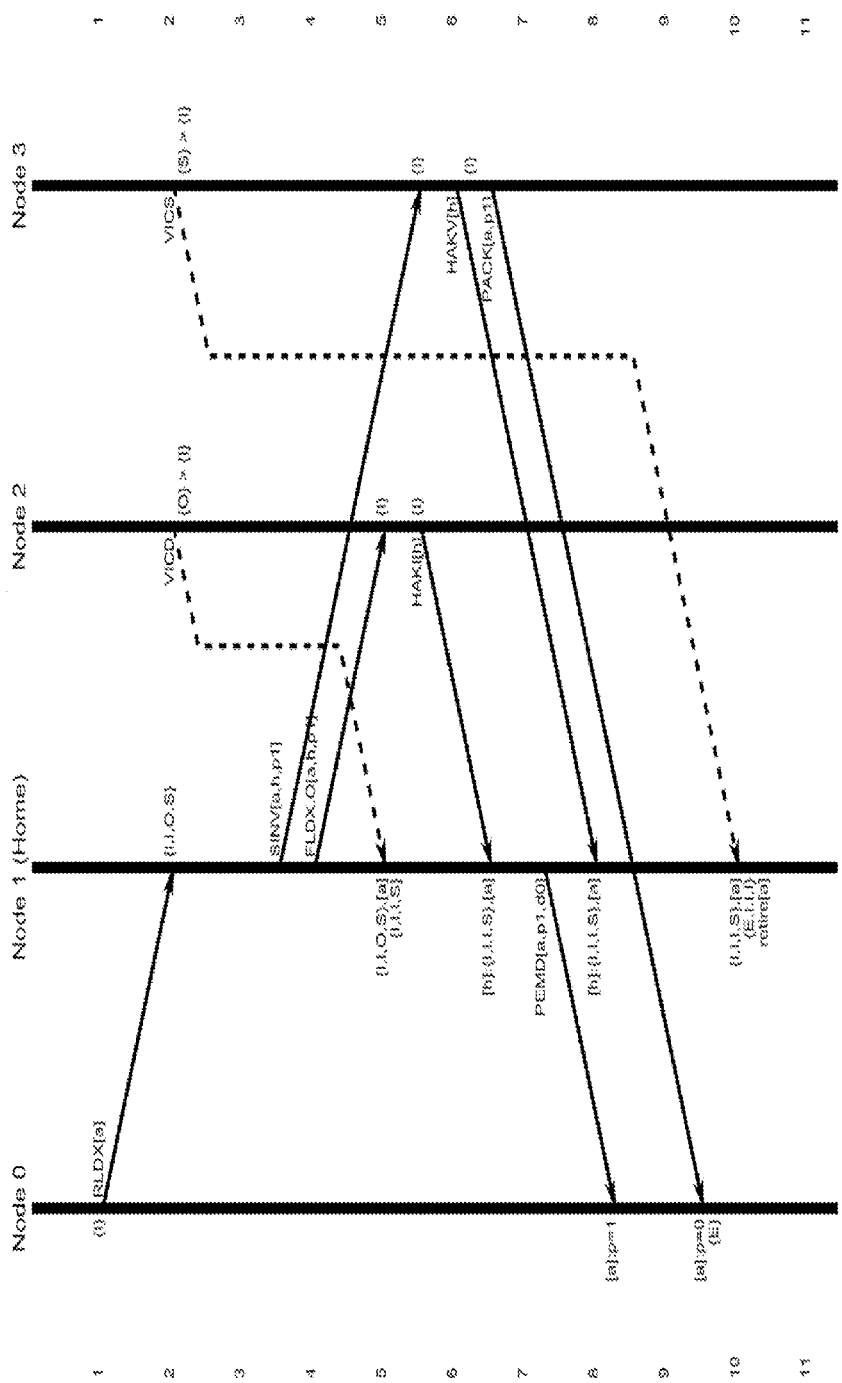
FIG. 16 is a flow diagram illustrating a fifth scenario of out-of-order messages exchanged between a set of nodes in a multi-node system, according to at least one example embodiment.

FIG. 16 is a flow diagram illustrating a fifth scenario of out-of-order messages exchanged between a set of nodes in a multi-node system, according to at least one example embodiment. In particular, the scenario of FIG. 16 illustrates a case for a request for an exclusive copy, e.g., RLDX message, of the data block sent from node 0—a remote node—to the home node (node 1). When the home node (node 1) receives the request for exclusive copy, it realizes based on the state information it maintains that node 2—a remote node— has a copy of the data block with corresponding state O, and node 3—a remote node—has another copy of the data block with corresponding state S. The home node (node 1) sends a first forward message, e.g., FLDX.O, asking node 2 to send a copy of the data block to the requesting node (node 0). Besides asking node 2 to send a copy of the data block to node 0, the first forward message, e.g., FLDX.O, is configured to cause the copy of the data block owned by node 2 to be invalidated. The home node (node 1) also sends a second forward message, e.g., SINV, to node 3 requesting invalidation of the shared copy at node 3.

However, by the time the first and second forward messages are received by, respectively, node 2 and node 3, both node 2 and node 3 had already evicted their copies of the data block. Specifically, node 2 evicted its owned copy, changed its state from O to I, and sent a VICD message to the home node (node 1) to indicate the eviction of its owned copy. Also, node 3 evicted its shared copy, changed its state from S to I, and sent a VICS message to the home node (node 1) to indicate the eviction of its shared copy. The home node (node 1) receives the VICD message from node 2 after sending the first forward message, e.g., FLDX.O, to node 2. In response to receiving the VICD message from node 2, the home node updates the maintained state for node 2 from O to I. Later, the home node receives a response, e.g., HAKI, to the first forward message sent to node 2. The response, e.g., HAKI, indicates that node 2 received the first forward message but its state is I, and, as such, the response, e.g., HAKI, does not include a copy of the data block.

After receiving the response, e.g., HAKI, from node 2, the home node responds, e.g., PEMD, to node 0 by providing a copy of the data block. The copy of the data block is obtained from the memory attached to the home node. The home node, however, keeps the maintained state from node 0 as I even after providing the copy of the data block to the node 0. The reason for not changing the maintained state for node 0 to E is that the home node (node 1) is still waiting for a confirmation from node 3 indicating that the shared copy at node 3 is invalidated. Also, the response, e.g., PEMD, from the home node (node 1) to node 0 indicates the number of responses to be expected by the requesting node (node 0). In FIG. 16, the parameter p1 associated with the PEMD message indicates that one other response is to be sent to the requesting node (node 0). As such, node 0 does not change its state when receiving the PEMD message from the home node (node 1) and waits for the other response.

Later the home node (node 1) receives a response, e.g., HAKV, to the second forward message acknowledging, by node 3, that it received the second forward message, e.g., SINV, but its state is I. At this point, the home node (node 1) still waits for a message, e.g., VICS, from node 3 indicating that the state at node 3 transitioned from S to I. Once the home node (node 1) receives the VICS message from node 3, the home node (node 1) changes the state maintained for node 3 from S to I, and changes the state maintained for node 0 from I to E since at this point the home node (node 1) knows that only node 0 has a copy of data block.

Node 3 also sends a message, e.g., PACK, acknowledging invalidation of the shared copy at node 3, to the requesting node (node 0). Upon receiving the acknowledgement of invalidation of the shared copy at node 3, node 0 changes its state from I to E.

While this invention has been particularly shown and described with references to example embodiments thereof, it will be understood by those skilled in the art that various changes in form and details may be made therein without departing from the scope of the invention encompassed by the appended claims.

What is claimed is:

1. A method of providing memory coherence between multiple chip devices of a multi-chip system, the method comprising:
    maintaining, at a first chip device of the multi-chip system, state information indicative of one or more states of one or more copies of a data block, the data block stored in a memory associated with one of the multiple chip devices, the one or more copies of the data block residing in one or more chip devices of the multi-chip system;
    receiving, by the first chip device, a message associated with a copy of the one or more copies of the data block from a second chip device of the multiple chip devices; and
    in response to the message received, executing, by the first chip device, a scheme of one or more actions determined based on the state information maintained at the first chip device and the message received;
    wherein the data block is stored in a memory attached to the first chip device and the message is indicative of a state, maintained at the second chip device, of a copy of the data block residing in the second chip device.

2. The method as recited in claim 1, wherein the one or more states of the one or more copies of the data block include at least one of:
    an exclusive copy;
    a shared copy;
    a modified copy;
    an owned copy; and
    an invalid copy.

3. The method as recited in claim 1, further comprising determining the scheme of one or more actions, said determining includes:
    upon receiving the message, detecting a discrepancy between the state, of the copy of the data block residing in the second chip device, indicated by the message received, and a state of the same copy of the data block in the state information maintained by the first chip device.

4. The method as recited in claim 3, wherein executing the scheme of one or more actions includes:
    upon detecting the discrepancy, waiting for receipt of another message, by the first chip device, from the second chip device.

5. The method as recited in claim 4, wherein executing the scheme of one or more actions further includes:
    updating the state of the same copy of the data block, in the state information maintained by the first chip device, to a transient state until the other message is received from the second chip device; and
    upon receiving the other message, updating the state of the same copy of the data block, in the state information maintained by the first chip device, to a state indicated by the other message received.

6. The method as recited in claim 4, wherein executing the scheme of one or more actions further includes at least one of:
    upon receiving the other message, sending a response message to the second chip device;
    upon receiving the other message, updating the state of the same copy of the data block in the state information maintained by the first chip device;
    upon receiving the other message, sending a message to another chip device, other than the second chip device, of the multiple chip devices;
    upon receiving the other message, updating the data block stored in the memory attached to the first chip device;

upon receiving the other message, updating a copy of the data block residing in the first chip device;
upon receiving the other message, causing at least one copy of the one or more copies of the data block to be invalidated.

7. The method as recited in claim 6, wherein updating the data block includes:
receiving an indication referring to a sub-block of multiple sub-blocks in the data block;
receiving a modified copy of the sub-block referred to by the indication; and
updating, in the data block, the sub-block referred to by the indication based on the modified copy of the sub-block received.

8. A method of providing memory coherence between multiple chip devices of a multi-chip system, the method comprising:
maintaining, at a first chip device of the multi-chip system, state information indicative of one or more states of one or more copies of a data block, the data block stored in a memory associated with one of the multiple chip devices, the one or more copies of the data block residing in one or more chip devices of the multi-chip system;
receiving, by the first chip device, a message associated with a copy of the one or more copies of the data block from a second chip device of the multiple chip devices; and
in response to the message received, executing, by the first chip device, a scheme of one or more actions determined based on the state information maintained at the first chip device and the message received, wherein the data block is stored in a memory attached to the second chip device and wherein the message is indicative of a state, maintained at the second chip device, of a copy of the data block residing in the first chip device.

9. The method as recited in claim 8, further comprising determining the scheme of one or more actions, said determining includes:
upon receiving the message, detecting a discrepancy between the state, of the copy of the data block residing in the first chip device, indicated by the message received, and a state of the same copy of the data block in the state information maintained by the first chip device.

10. The method as recited in claim 9, wherein executing the scheme of one or more actions includes:
upon detecting the discrepancy, sending a response message to the second chip device indicative of the state of the same copy of the data block in the state information maintained by the first chip device.

11. The method as recited in claim 10, wherein executing the scheme of one or more actions further includes:
storing information indicative of the message received until receipt of an other message from the second chip device.

12. The method as recited in claim 11, wherein executing the scheme of one or more actions further includes:
upon receiving the other message from the second chip device, providing the second chip device with a response to the other message received.

13. A multi-chip system comprising:
multiple chip devices;
a memory attached to one of the multiple chip devices, the memory storing a data block; and
a controller in the first chip device, the controller being configured to:
maintain state information indicative of one or more states of one or more copies of the data block, the one or more copies of the data block residing in one or more chip devices of the multiple chip devices;
receive a message associated with a copy of the one or more copies of the data block from a second chip device of the multiple chip devices; and
in response to the message received, execute a scheme of one or more actions determined based on the state information maintained at the first chip device and the message received
wherein the data block is stored in a memory attached to, or residing in, the first chip device and the message is indicative of a state, maintained at the second chip device, of a copy of the data block residing in the second chip device.

14. The multi-chip system as recited in claim 13, wherein the one or more states of the one or more copies of the data block include at least one of:
an exclusive copy;
a shared copy;
a modified copy;
an owned copy; and
an invalid copy.

15. The multi-chip system as recited in claim 13, wherein the controller is further configured to determine the scheme of one or more actions, in determining the scheme of one or more actions, the controller is further configured to:
upon receiving the message, detect a discrepancy between the state, of the copy of the data block residing in the second chip device, indicated by the message received, and a state of the same copy of the data block in the state information maintained by the first chip device.

16. The multi-chip system as recited in claim 15, wherein in executing the scheme of one or more actions, the controller is further configured to:
upon detecting the discrepancy, wait for receipt of an other message, by the first chip device, from the second chip device.

17. The multi-chip system as recited in claim 16, wherein in executing the scheme of one or more actions, the controller is further configured to:
update the state of the same copy of the data block, in the state information maintained by the first chip device, to a transient state until the other message is received from the second chip device; and
upon receiving the other message, update the state of the same copy of the data block, in the state information maintained by the first chip device, to a state indicated by the other message received.

18. The multi-chip system as recited in claim 16, wherein in executing the scheme of one or more actions, the controller is further configured to:
upon receiving the other message, send a response message to the second chip device;
upon receiving the other message, update the state of the same copy of the data block in the state information maintained by the first chip device;
upon receiving the other message, send a message to another chip device, other than the second chip device, of the multiple chip devices;
upon receiving the other message, update the data block stored in the memory attached to the first chip device;
upon receiving the other message, update a copy of the data block residing in the first chip device;

upon receiving the other message, cause at least one copy of the one or more copies of the data block to be invalidated.

19. The multi-chip system as recited in claim 18, wherein in updating the data block, the controller is configured to:
receive an indication referring to a sub-block of multiple sub-blocks in the data block;
receive a modified copy of the sub-block referred to by the indication; and
update, in the data block, the sub-block referred to by the indication based on the modified copy of the sub-block received.

20. A multi-chip system comprising:
multiple chip devices;
a memory attached to one of the multiple chip devices, the memory storing a data block; and
a controller in the first chip device, the controller being configured to:
maintain state information indicative of one or more states of one or more copies of the data block, the one or more copies of the data block residing in one or more chip devices of the multiple chip devices;
receive a message associated with a copy of the one or more copies of the data block from a second chip device of the multiple chip devices; and
in response to the message received, execute a scheme of one or more actions determined based on the state information maintained at the first chip device and the message received;
wherein the data block is stored in a memory attached to the second chip device and wherein the message is indicative of a state, maintained at the second chip device, of a copy of the data block residing in the first chip device.

21. The multi-chip system as recited in claim 20, wherein the controller is further configured to determine the scheme of one or more actions, in determining the scheme of one or more actions, the controller is further configured to:
upon receiving the message, detect a discrepancy between the state, of the copy of the data block residing in the first chip device, indicated by the message received, and a state of the same copy of the data block in the state information maintained by the first chip device.

22. The multi-chip system as recited in claim 21, wherein in executing the scheme of one or more actions, the controller is further configured to:
upon detecting the discrepancy, send a response message to the second chip device indicative of the state of the same copy of the data block in the state information maintained by the first chip device.

23. The multi-chip system as recited in claim 22, wherein in executing the scheme of one or more actions, the controller is further configured to:
store information indicative of the message received until receipt of an other message from the second chip device.

24. The multi-chip system as recited in claim 23, wherein in executing the scheme of one or more actions, the controller is further configured to:
upon receiving the other message from the second chip device, provide the second chip device with a response to the other message received.

* * * * *